(12) United States Patent
Emira et al.

(10) Patent No.: US 9,306,450 B2
(45) Date of Patent: Apr. 5, 2016

(54) HIGH VOLTAGE CHARGE PUMP

(75) Inventors: Ahmed A. Emira, Mission Viejo, CA (US); Mohamed Abdelghany, Thuwal (SA); Mohannad Yomn Elsayed, Thuwal (SA); Amro M. Elshurafa, Thuwal (SA); Khaled Nabil Salama, Thuwal (SA)

(73) Assignee: King Abdullah University of Science and Technology, Thuwal (SA)

(*) Notice: Subject to any disclaimer, the term of this patent is extended or adjusted under 35 U.S.C. 154(b) by 0 days.

(21) Appl. No.: 14/239,335

(22) PCT Filed: Aug. 24, 2012

(86) PCT No.: PCT/US2012/052226
§ 371 (c)(1),
(2), (4) Date: May 8, 2014

(87) PCT Pub. No.: WO2013/028956
PCT Pub. Date: Feb. 28, 2013

(65) Prior Publication Data
US 2014/0300409 A1 Oct. 9, 2014

Related U.S. Application Data

(60) Provisional application No. 61/527,202, filed on Aug. 25, 2011.

(51) Int. Cl.
*G05F 1/10* (2006.01)
*H02M 3/07* (2006.01)

(52) U.S. Cl.
CPC ............... *H02M 3/07* (2013.01); *H02M 3/073* (2013.01)

(58) Field of Classification Search
CPC . H02M 3/07; H02M 3/073; H02M 2003/077; G11C 5/145
See application file for complete search history.

(56) References Cited

U.S. PATENT DOCUMENTS

| 5,880,612 | A | 3/1999 | Kim | |
|---|---|---|---|---|
| 6,066,537 | A * | 5/2000 | Poh | 438/393 |
| 6,617,832 | B1 | 9/2003 | Kobayashi | |
| 6,727,735 | B2 | 4/2004 | Park | |
| 2003/0206042 | A1 * | 11/2003 | Walker et al. | 327/156 |
| 2004/0004851 | A1 * | 1/2004 | Itoh | 363/124 |
| 2004/0085104 | A1 | 5/2004 | Sanchez | |
| 2008/0205134 | A1 | 8/2008 | Kato | |
| 2010/0079439 | A1 | 4/2010 | Bar et al. | |
| 2012/0182058 | A1 * | 7/2012 | Yang et al. | 327/295 |

OTHER PUBLICATIONS

International Search Report Application No. PCT/US2012/052226 dated Nov. 6, 2012, 2 pages.

* cited by examiner

*Primary Examiner* — Sibin Chen
(74) *Attorney, Agent, or Firm* — Thomas | Horstemeyer, LLP

(57) ABSTRACT

Various embodiments of a high voltage charge pump are described. One embodiment is a charge pump circuit that comprises a plurality of switching stages each including a clock input, a clock input inverse, a clock output, and a clock output inverse. The circuit further comprises a plurality of pumping capacitors, wherein one or more pumping capacitors are coupled to a corresponding switching stage. The circuit also comprises a maximum selection circuit coupled to a last switching stage among the plurality of switching stages, the maximum selection circuit configured to filter noise on the output clock and the output clock inverse of the last switching stage, the maximum selection circuit further configured to generate a DC output voltage based on the output clock and the output clock inverse of the last switching stage.

19 Claims, 29 Drawing Sheets

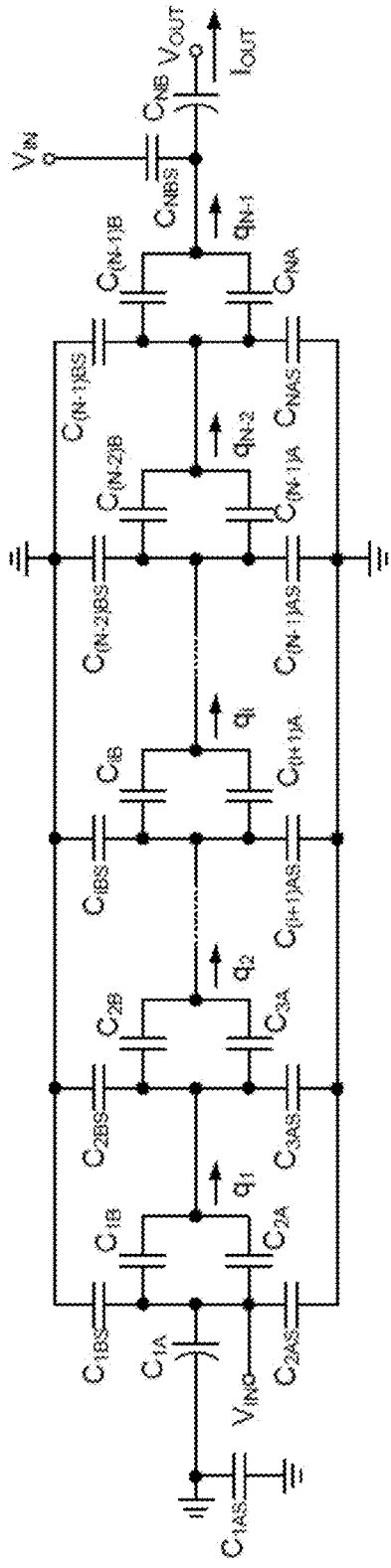
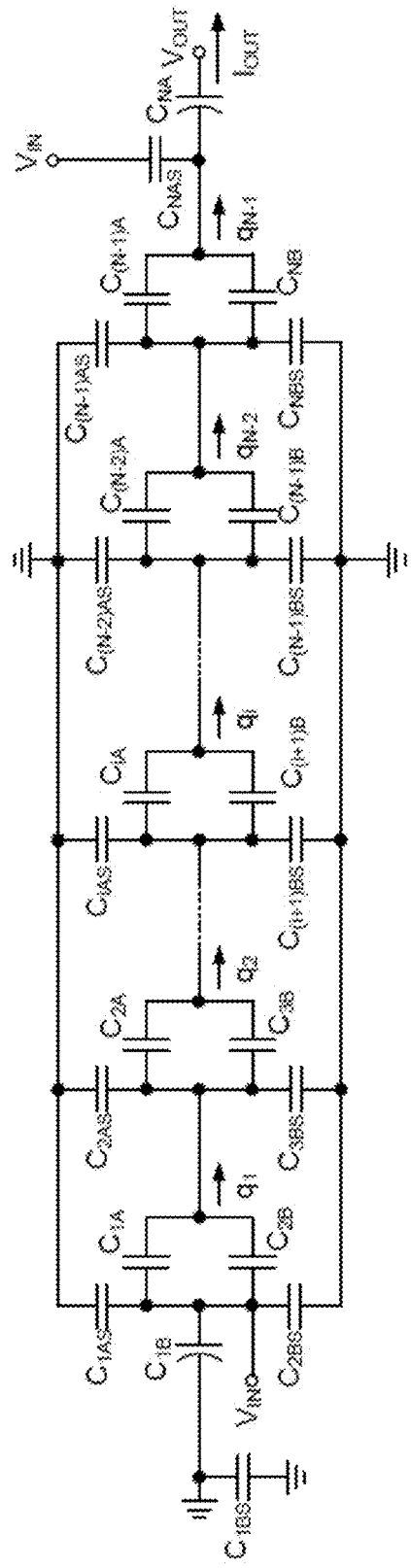
FIG. 13A
FIG. 13B

| Reference | Max. $V_{out}$[a] | N[b] | Supply Voltage | Load current | Technology | Switching frequency | Pumping capacitor | Max. cap. voltage[d] | Active devices |
|---|---|---|---|---|---|---|---|---|---|
| SCCP-OS | 42.3V | 14 | 6V | 10μA @ 10%drop | 0.6μm CMOS | 2MHz | 50pF | 6V | PMOS only[e] |
| SCCP-DCS | 51 | 18 | 6V | 4μA @ 10%drop | 0.6μm CMOS | 500kHz | 50pF | 6V | PMOS only |
| [25] | 19.6 | 6 | 3.3V | 20μA | 0.35μm SOI CMOS | 4MHz | 16pF | 16.3V | Diodes only |
| [26] | 26.9 | 9 | 3.3V | 80μA | 0.35μm SOI CMOS | 4MHz | 30pF | 23.6V | PMOS-NMOS |
| [19][c] | 38 | 3 | 5V | 2mA | 0.7μm-100V CMOS | 1MHz | Not specified | 39V | PMOS-NMOS |
| [18] | 8.7 | 4 | 2.5V | 380μA | 0.13μm CMOS | 303MHz | 27pF | 6.3V | NMOS only |
| [31] | 14.8 | 10 | 1.8V | 0.7μA | 0.18μm CMOS | 500MHz | 10pF | 13V | PMOS-NMOS |
| [33] | 28 | 12 | 2.5V | 3μA @ 20%drop | 0.25μm CMOS w/ polySi diodes | 1MHz | Not specified | 25.5V | Diodes only | a One may notice that the number of stages in the proposed charge pumps is higher than others. This is attributed to the chosen series-capacitor topology which increases the charge pump sensitivity to parasitic capacitors. The use of poly0-poly1 pumping capacitors resulted in even higher parasitics due to their proximity to the substrate.

b The proposed charge pumps offers the highest output voltage using CMOS technology compared to other charge pumps proposed in the literature.

c This reference has only simulation results. Exponential charge pump architecture is used.

d Maximum voltage across pumping capacitors is VOUT - VIN in most cases, except for the proposed designs and in [19].

e Except for the first stage clock level shifting circuit where NMOS transistors are used.

[25] M. Hoque, T. McNutt, J. Zhang, A. Mantooth, and M. Mojarradi, "A high voltage Dickson charge pump in SOI CMOS," in Custom Integrated Circuits Conference, 2003. Proceedings of the IEEE 2003, 2003, pp. 493–496.

[26] M. Hoque, T. Ahmad, T. McNutt, A. Mantooth, and M. Mojarradi, "Design technique of an on-chip, high voltage charge pump in SOI," in Circuits and Systems, 2005. ISCAS 2005. IEEE International Symposium on, May 2005, pp. 133–136 Vol. 1.

[19] R. Casanova, P. Miribel-Catala, A. Saiz, M. Puig-Vidal, and J. Samitier, "Design of a step-up 400 mW@ 40V charge-pump for microrobotics applications in a 100 V-0.7m intelligent interface technology," in Industrial Electronics, 2004 IEEE International Symposium on, vol. 2, may 2004, pp. 1227–1229 vol. 2.

[18] O. Khouri, S. Gregori, A. Cabrini, R. Micheloni, and G. Torelli, "Improved charge pump for flash memory applications in triple well CMOS technology," in Industrial Electronics, 2002. ISIE 2002. Proceedings of the 2002 IEEE International Symposium on, vol. 4, 2002, pp. 1322 – 1326 vol.4.

[31] M. Innocent, P. Wambacq, S. Donnay, W. Sansen, and H. De Man, "A linear high voltage charge pump for MEMs applications in 0.18m CMOS technology," in Solid-State Circuits Conference, 2003. ESSCIRC '03. Proceedings of the 29th European, sept. 2003, pp. 457– 460.

[33] M.-D. Ker and S.-L. Chen, "On-Chip High-Voltage Charge Pump Circuit in Standard CMOS Processes With Polysilicon Diodes," in Asian Solid-State Circuits Conference, 2005.

FIG. 20

Vout vs. No. of stages $V_{out}$ vs. $f_{clk}$ at $V_{ref}$ =2.5V and $I_{out}$ =0.1uA Output voltage of a 13-stage charge pump

|  | (Simulated) All-PMOS Charge Pump | (Simulated) NMOS/PMOS Charge Pump | [1] | [2] | [3] |
|---|---|---|---|---|---|
| Maximum Voltage | 52 V | 60V | 14.8 V | 50 V | 30 V |
| Technology | 0.6 μm CMOS | 0.6 μm CMOS | 0.18 μm CMOS | 0.8 μm CMOS | 0.35 μm CMOS with Polysilicon Diodes |
| Supply Voltage | 5 V | 5 V | 1.8 V | 5 V | 2.5 V |
| Current output | 1 μA | 1 μA | 0.7 μA | --- | 2 μA |
| Number of stages | 18 | 13 | --- | 16 | 12 |

[1] Innocent, M., Wambacq, Piet, Donnay, S., Sansen, W., De Man, H., "A linear high voltage charge pump for MEMs applications in 0.18μm CMOS technology" Proceedings of the 29th European Solid-State Circuits Conference, 2003. ESSCIRC '03.

[2] Jean-Franpis Richard and Yvon Savaria, "High Voltage Charge Pump Using Standard CMOS Technology", The 2nd Annual IEEE Northeast Workshop on Circuits and Systems, 2004. NEWCAS 2004.

[3] Ming-Dou Ker and Shih-Lun Chen, "On-Chip High-Voltage Charge Pump Circuit in Standard CMOS Processes With Polysilicon Diodes", Asian Solid-State Circuits Conference, 2005

FIG. 29

HIGH VOLTAGE CHARGE PUMP

CROSS REFERENCE TO RELATED APPLICATIONS

This application is the National Stage of International Application No. PCT/US2012/052226, filed Aug. 24, 2012, which claims the benefit of and priority to U.S. provisional application no. 61/527,202, filed Aug. 25, 2011, the contents of all of which are incorporated by reference as if fully set forth herein.

TECHNICAL FIELD

The present disclosure discloses embodiments of a charge pump.

BACKGROUND

Despite the ongoing demand for reducing power consumption of circuits, many applications still require high voltage to operate. Such applications include, for example, microelectromechanical systems (MEMS) interfaces, Electrically Erasable Programmable Read-Only Memory (EEPROM) programmers, liquid crystal display (LCD) drivers, and so on. Capacitive charge pumps are used to generate the required high voltage in low power applications, while step-up DC-to-DC converters are used in high power applications.

One issue with conventional charge pump implementations is that such designs suffer from the continuous increase in the threshold voltage from stage to stage due to the increase in the bulk-source voltage. To further illustrate, reference is made to a conventional charge pump 100 shown in FIG. 1. As shown, each switching stage 102a, 102b, 102c has three inputs: a clock, the clock inverse, and the input voltage, and each stage produces an output that is greater than the input voltage of that stage by $V_{in}-\delta$, where $\delta$ is the threshold voltage of the transistors used in the stage if no technique is used to eliminate the threshold voltage loss, and $\delta$ equals zero if some technique is used to eliminate the threshold voltage loss. This voltage increase is produced by the pumping capacitors $C_{pi}$ (i=1, 2, ..., N) and the switching stages 102a, 102b, 102c. The voltage across the pumping capacitors $C_{P1}$ in the first stage 102a is $V_{in}-\delta$. In the second stage 102b, the voltage across the pumping capacitors $C_{P2}$ increases to $2V_{in}-2\delta$.

The voltage across the pumping capacitors continues to increase with each stage such that the voltage reaches $NV_{in}-N\delta$ at the (final) $N^{th}$ stage. Thus, high voltage capacitors must be used to implement the pumping capacitors in such designs as the one illustrated in FIG. 1. However, high voltage capacitors usually have high dielectric thickness in order to maintain acceptable electric field in the dielectric. This leads to a relatively low capacitance density (capacitance per unit area). Hence, a large area is required to implement the required capacitance for the charge pump. Since the charge pump area is usually dominated by the pumping capacitors, the overall area of the charge pump becomes unacceptably large.

SUMMARY

Embodiments of the present disclosure are related to charge pumps, in particular charge pump circuits, that address the aforementioned disadvantages, among others. Briefly described, a charge pump circuit of the present disclosure can include a plurality of switching stages each including a clock input and a clock output and a plurality of pumping capacitors, wherein one or more of the pumping capacitors are coupled to a corresponding switching stage. In aspects of the present disclosure, the charge pump circuit may also include a maximum selection circuit coupled to a last switching stage among the plurality of switching stages. The maximum selection circuit may generate an output voltage, for example a direct current (DC) output voltage, based on an output of the last switching stage. In an embodiment, for each switching stage, a pumping capacitor may be coupled across the clock input and the clock output of the switching stage, wherein the clock output for each switching stage is greater than the corresponding input clock by approximately $V_{in}$, wherein $V_{in}$ is a voltage level of the first clock input. In an embodiment, each switching stage may also include clock input inverse and a clock output inverse. A pumping capacitor may be coupled across the clock input inverse and the clock output inverse of the switching stage. The maximum selection circuit may be configured to filter noise on the output clock and the output clock inverse of a switching stage, for example the last switching stage. The maximum selection circuit may also be configured to generate a direct current (DC) output voltage based on the output clock and the output clock inverse of a switching stage, for example the last switching stage. The maximum selection circuit may be coupled to a last switching stage among the plurality of switching stages to generate an output voltage based on an output of the last switching stage. The circuit may be a variable charge pump circuit that includes a low-dropout (LDO) regulator coupled to the last switching stage, wherein the LDO regulator is configured to adjust an input voltage of the variable charge pump circuit.

An exemplary embodiment of the present disclosure, among others, is a charge pump circuit that comprises a plurality of switching stages each including a clock input, a clock input inverse, a clock output, and a clock output inverse. The circuit further comprises a plurality of pumping capacitors, wherein one or more pumping capacitors are coupled to a corresponding switching stage. The circuit also comprises a maximum selection circuit coupled to a last switching stage among the plurality of switching stages, the maximum selection circuit configured to filter noise on the output clock and the output clock inverse of the last switching stage, the maximum selection circuit further configured to generate a direct current (DC) output voltage based on the output clock and the output clock inverse of the last switching stage.

In one or more aspects of the embodiment, both a clock input and a clock input inverse of the first switching stage among the plurality of switching stages can be configured to receive an input ranging from 0V to an input voltage (Vin). A pumping capacitor can be connected across the clock input and clock output of each switching stage, and wherein a pumping capacitor is connected across the clock input inverse and the clock output inverse of each switching stage. The pumping capacitors can include low voltage capacitors with a voltage rating of approximately Vin. The voltage gain of each of the switching stages can be equal to Vin. An output voltage ($V_{out}$) at the last switching stage can be expressed as:

$$V_{out}=(N+1)V_{in}-NV_t,$$

wherein N represents the total number of switching stages, $V_{in}$ represents an input peak voltage of the clock input at the first switching stage, and $V_t$ represents a threshold voltage.

Another exemplary embodiment, among others, is a variable charge pump circuit that comprises a plurality of switching stages each including a clock input, a clock input inverse, a clock output, and a clock output inverse. The circuit further comprises a plurality of pumping capacitors, wherein one or more pumping capacitors are coupled to a corresponding switching stage. The circuit also comprises a low-dropout (LDO) regulator coupled to the last switching stage, wherein the LDO regulator is configured to adjust an input voltage of the variable charge pump circuit. For example, an output voltage ($V_{LDO}$) of the LDO regulator can be expressed as:

$$V_{LDO} = \left(1 + \frac{R_2}{R_1}\right) V_{ref}.$$

wherein $R_1$ and $R_2$ are voltage divider resistors in the LDO regulator, and wherein $V_{ref}$ is a reference voltage, wherein the output voltage ($V_{LDO}$) of the LDO regulator is the input voltage of the variable charge pump circuit.

Another embodiment, among others, is a charge pump circuit that comprises a plurality of switching stages each including a clock input and a clock output. The charge pump further comprises a plurality of pumping capacitors, wherein for each switching stage, a pumping capacitor is coupled across the clock input and the clock output, wherein the clock output for each switching stage is greater than the corresponding input clock by approximately $V_{in}$, wherein $V_{in}$ is a voltage level of the first clock input. The charge pump further comprises a maximum selection circuit coupled to a last switching stage among the plurality of switching stages to generate an output voltage based on an output of the last switching stage.

In one or more aspects of the above embodiments, the circuit switching stages include a clock input inverse and a clock level shifting circuit configured to generate a differential clock signal for a clock input and a clock input inverse of the first switching stage among the plurality of switching stages, wherein the differential clock signal ranges from approximately 0V to 2Vin. The clock level shifting circuit can include a plurality of clock level shifting stages, wherein each clock level shifting stage is coupled to a corresponding switching stage. Each of the plurality of clock level shifting stages can comprise P-type metal-oxide-semiconductor (PMOS) transistors.

In one or more aspects of the above embodiments, each of the plurality of switching stages can comprise P-type metal-oxide-semiconductor (PMOS) transistors. Each of the plurality of switching stages can further comprise an n-type metal-oxide-semiconductor (NMOS) transistor. Each of the pumping capacitors can be shielded by an nwell layer. Further, each nwell shield layer for each pumping capacitor can be connected to a clock signal with a same polarity of the corresponding pumping capacitor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 13A and 13B illustrate an alternative embodiment of the pumping capacitor configuration that may be used with the charge pump architecture disclosed.

FIG. 20 is a table of the output voltage, load current capability, etc. of the charge pump configurations disclosed herein compared to other charge pump configurations.

FIG. 29 provides a comparison between the all-PMOS charge pump configuration and NMOS/PMOS charge pump configuration described herein versus conventional charge pump configurations.

DETAILED DESCRIPTION

Figure 1:
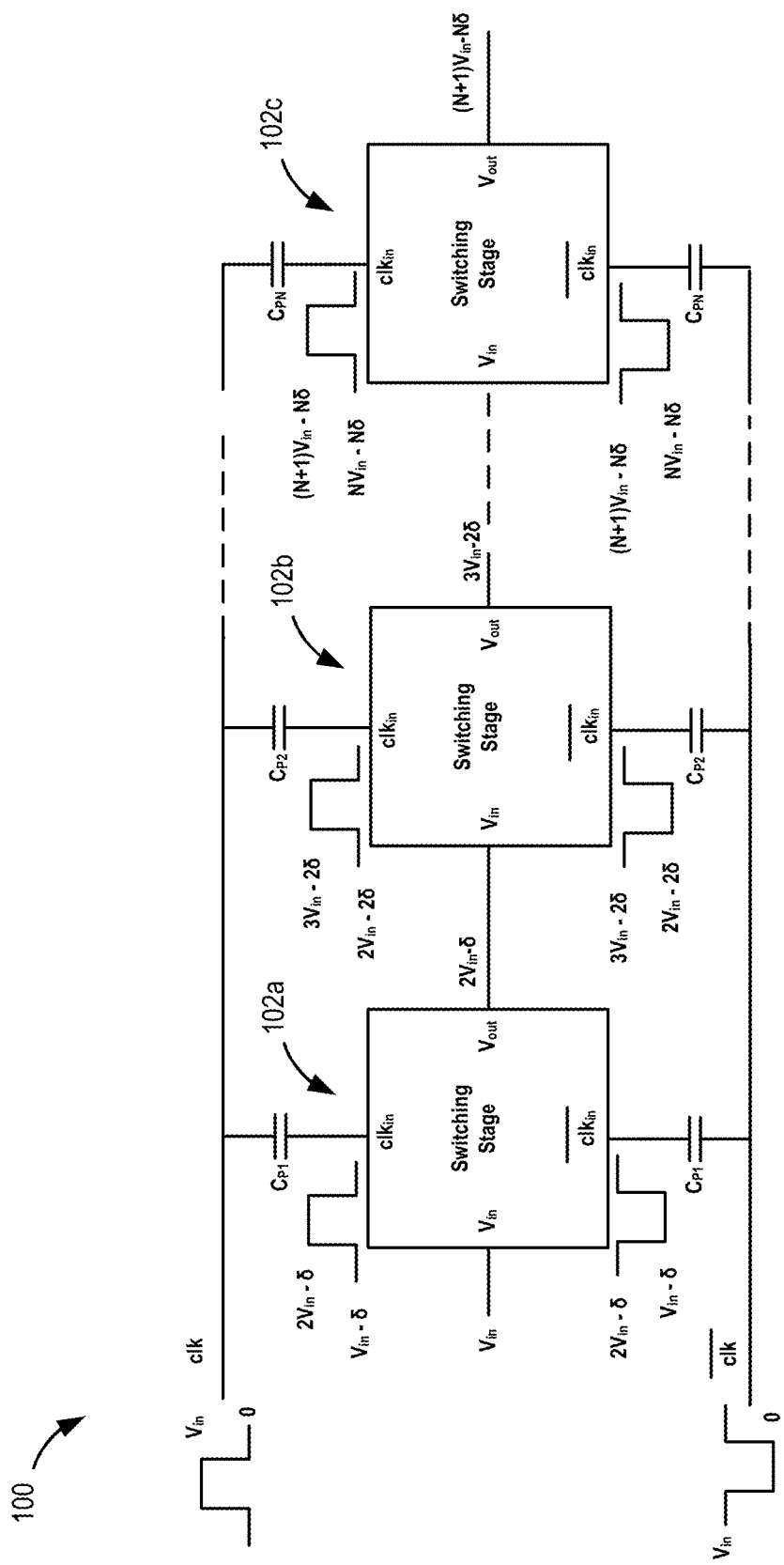
FIG. 1 depicts a system block diagram of a conventional charge pump configuration.
Figure 2A:
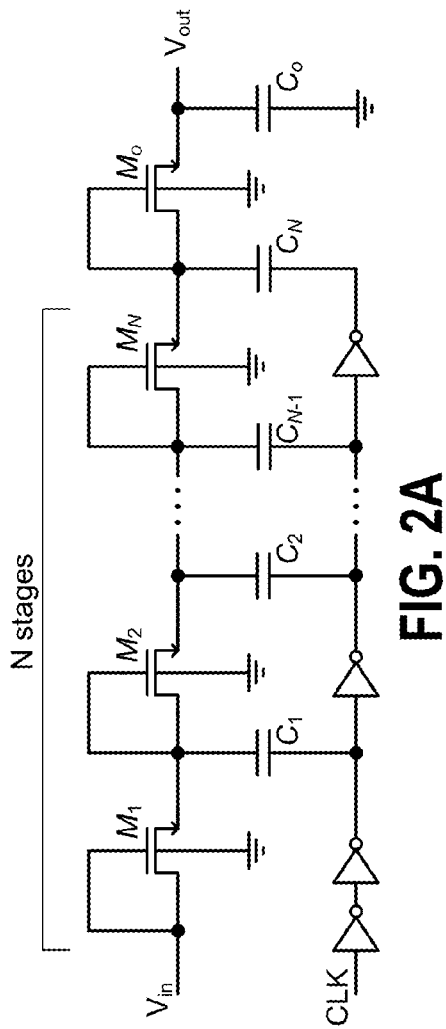
FIG. 2A depicts a conventional Dickson charge pump circuit.

One issue with conventional charge pump implementations is that such designs suffer from the continuous increase in the threshold voltage from stage to stage due to the increase in the bulk-source voltage. As known by those skilled in the art, one of the most common charge pump architectures is the Dickson charge pump such as the one shown in FIG. 2A. The output voltage of a Dickson charge pump is given by:

$$V_{out} = (N+1)V_{1N} - V_{t1} - V_{t2} - \ldots - V_{tN} - V_{to} \quad (1)$$

where $V_{tN}$ and $V_{to}$ are the threshold voltages of the Nth and output stages, respectively. This configuration suffers from the continuous increase in the threshold voltage from stage to stage due to the increase in the bulk-source voltage. Furthermore, the output voltage is limited by the breakdown voltage which forces the designer to the use of special manufacturing technologies.

Figure 2B:
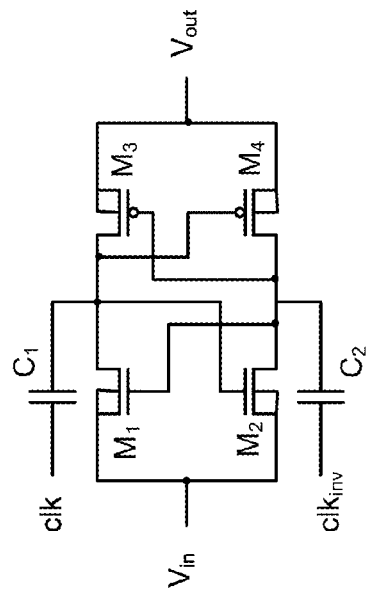
FIG. 2B depicts a conventional Pelliconi cascade charge pump.

As the charge pump area is usually dominated by the pumping capacitors, the overall area of the charge pump becomes unacceptably large. Another conventional charge pump configuration is the Pelliconi cascade charge pump, as shown in FIG. 2B. The output voltage of this charge pump configuration is given by:

$$V_{out} = (N+1)V_{in} \quad (2)$$

where N is the total number of stages. The Pelliconi charge pump consists of cascaded stages, where each stage receives a clock and its inverse as inputs in addition to the output voltage from the previous stage to produce a higher voltage than the input voltage by $V_{in}$.

Various embodiments are described for a charge pump configuration that utilizes high-density low-voltage capacitors by limiting the maximum voltages across the capacitors. Embodiments of the charge pump configuration disclosed herein are capable of producing various voltages ranging, for example, from 10V up to 60V using a tunable circuit where the output voltage is adjustable. Such features allow the disclosed implementations to be used in a wide range of high-voltage, low-power applications. In accordance with exemplary embodiments, the output voltage is produced through successive stages, where each stage feeds the next stage so that multiple voltages can be produced by the same circuit.

By utilizing the clocking scheme disclosed herein to limit the voltage across any transistor terminals to $2V_{in}$ and limit the voltage across pumping capacitors to $V_{in}$, complementary metal-oxide-semiconductor (CMOS) technology can be used for incorporating the switching stages of the charge pump configuration. Furthermore, the clocking scheme allows low voltage, high-density capacitors to be utilized in the charge pump configuration, thereby substantially decreasing the area used by these capacitors. Various embodiments of the charge pump disclosed herein operate on a wide range of clock frequencies ranging, for example, from 100 kHz up to 10 MHz.

Figure 3:
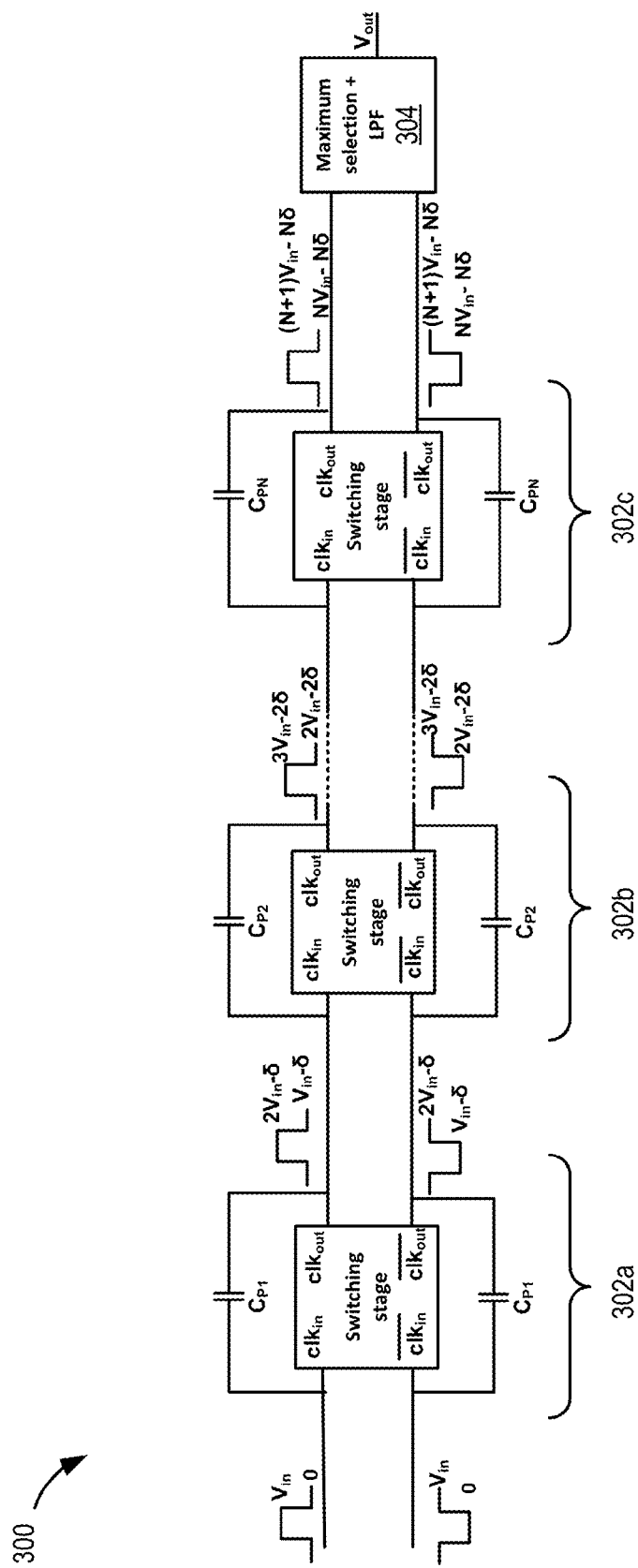
FIG. 3 depicts a system block diagram of an embodiment of a charge pump circuit of the present disclosure.

Reference is made to FIG. 3, which illustrates a system level diagram of an embodiment of a charge pump circuit 300.

As shown, each stage 302a, 302b, 302c includes an input clock ($clk_{in}$), an input clock inverse $\overline{clk_{in}}$, an output clock ($clk_{out}$), and an output clock inverse $\overline{clk_{out}}$. As described in more detail later, the charge pump circuit 300 is configured such that the voltage levels of the output clocks ($clk_{out}$) are higher than the input clock ($clk_{in}$) levels by $V_{in} - \delta$. Pumping capacitors ($C_{P1 \ldots N}$) are placed between the input ($clk_{in}$) and output clocks ($clk_{out}$) with the same polarity. Significantly, with the configuration shown in FIG. 3, the voltage across all the pumping capacitors ($C_{P1 \ldots N}$) is kept constant at a voltage $V_{in} - \delta$ across all the stages 302a, 302b, 302c. This allows low-voltage pumping capacitors to be used for the charge pump circuit 300 shown. The clock output of the $N^{th}$ stage are sent to a maximum-select circuit 304 to obtain the final DC output voltage at $(N+1)V_{in} - N\delta$. A single high-voltage output capacitor (not shown) is used at the output of the maximum-select circuit to filter out glitches and to sustain a high DC output voltage.

Figure 4:
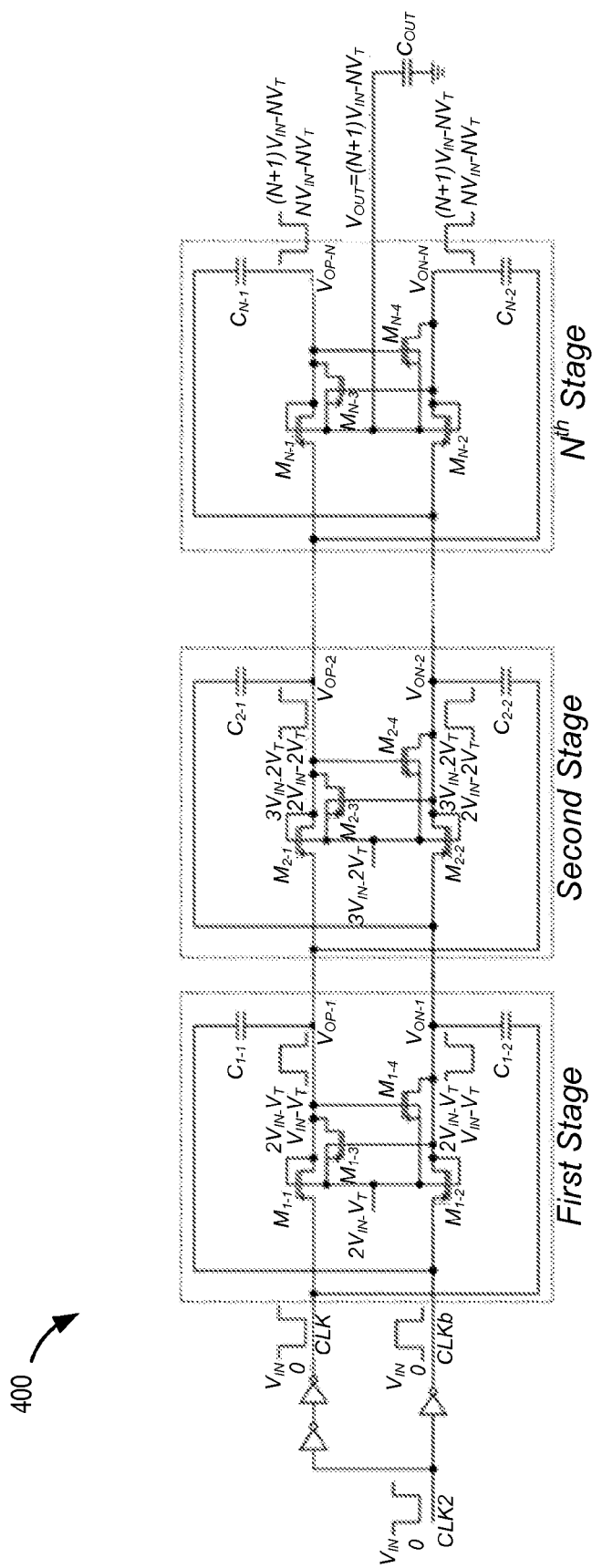
FIG. 4 illustrates an implementation of the charge pump circuit shown in FIG. 3.

The clocking scheme used in conjunction with one or more switching stages is now described. FIG. 4 illustrates an implementation of the charge pump circuit 300 shown in FIG. 3. The charge pump core 400 shown in FIG. 4 comprises a three-stage double charge pumping system. When n-type metal-oxide-semiconductor (NMOS) transistors are utilized in a Dickson charge pump configuration, the bulk terminals of the various transistors must be connected to ground, which leads to increasing the threshold voltage drop from stage to another as a result of the bulk effect as mentioned previously.

While utilizing P-type metal-oxide-semiconductor (PMOS) transistors is an alternative since the bulk terminal of each transistor can be connected separately, it cannot be directly connected to the source of the transistor, as in the other clock phase, the drain has a higher voltage than the source. This leads to parasitic diodes being turned on. The disclosed pump charge configurations address this issue by incorporating a double charge pumping scheme.

With reference to FIG. 4, the double charge pumping scheme is used. When CLK is high and CLKb is low, transistor $M_{1-1}$ turns ON and $M_{1-2}$ turns OFF, thereby setting $V_{O1P}$ to $V_{in} - V_t$ and $V_{O1N}$ to $2V_{in} - V_t$. When CLK switches to zero and CLKb switches to $V_{in}$, then $V_{O1P}$ switches to $2V_{in} - V_t$ and $V_{O1N}$ switches to $V_{in} - V_t$. The $V_{O1P}$ and $V_{O1N}$ signals are used as inputs and as clocks for the second (middle) stage. The outputs of the second stage, $V_{O2P}$ and $V_{O2N}$, toggle between $2V_{in} - 2V_t$ and $3V_{in} - 2V_t$ and are, in turn, used as inputs and clocks for the third stage.

In the embodiment shown in FIG. 4, the signals applied to any stage are derived only from the preceding stage. By using this configuration, the maximum voltage across any transistor is limited to $2V_{in} - V_t$, and the maximum voltage across any capacitor (except for $C_{OUT}$) is limited to $V_{in} - V_t$. Significantly, this holds true regardless of the number of stages. The output voltage for N stages charge pump can be expressed as:

$$V_{out} = (N+1)V_{in} - NV_t \quad (3)$$

By limiting the maximum voltage across the pumping capacitors, $C_{i-1}$ and $C_{i-2}$ (where i is the stage number), low-voltage high-density capacitors can be utilized, hence saving significant silicon area occupied by these capacitors. The threshold voltage does not increase from stage to stage and therefore, the output voltage varies linearly with the number of stages.

The cascaded clocking scheme is used by deriving the clock of each stage from the previous stage, thereby limiting the maximum voltage across the pumping capacitors in each stage to $V_{in} - V_t$. Note that the output capacitor, $C_{OUT}$, experiences the entire output voltage, and so a high-voltage capacitor must be used at the output. However, since the charge pump output is connected to a pin to be used in a MEMS gyroscope, for example, an external capacitor can be used for $C_{OUT}$. In a MEMS gyroscope, polarization voltage is used to tune either the driving or the sensing resonance frequency for the purpose of mode matching. With such applications, it is desirable to be able to program the polarization voltage over a large range from a few volts up to about 40V or higher.

Figure 5:
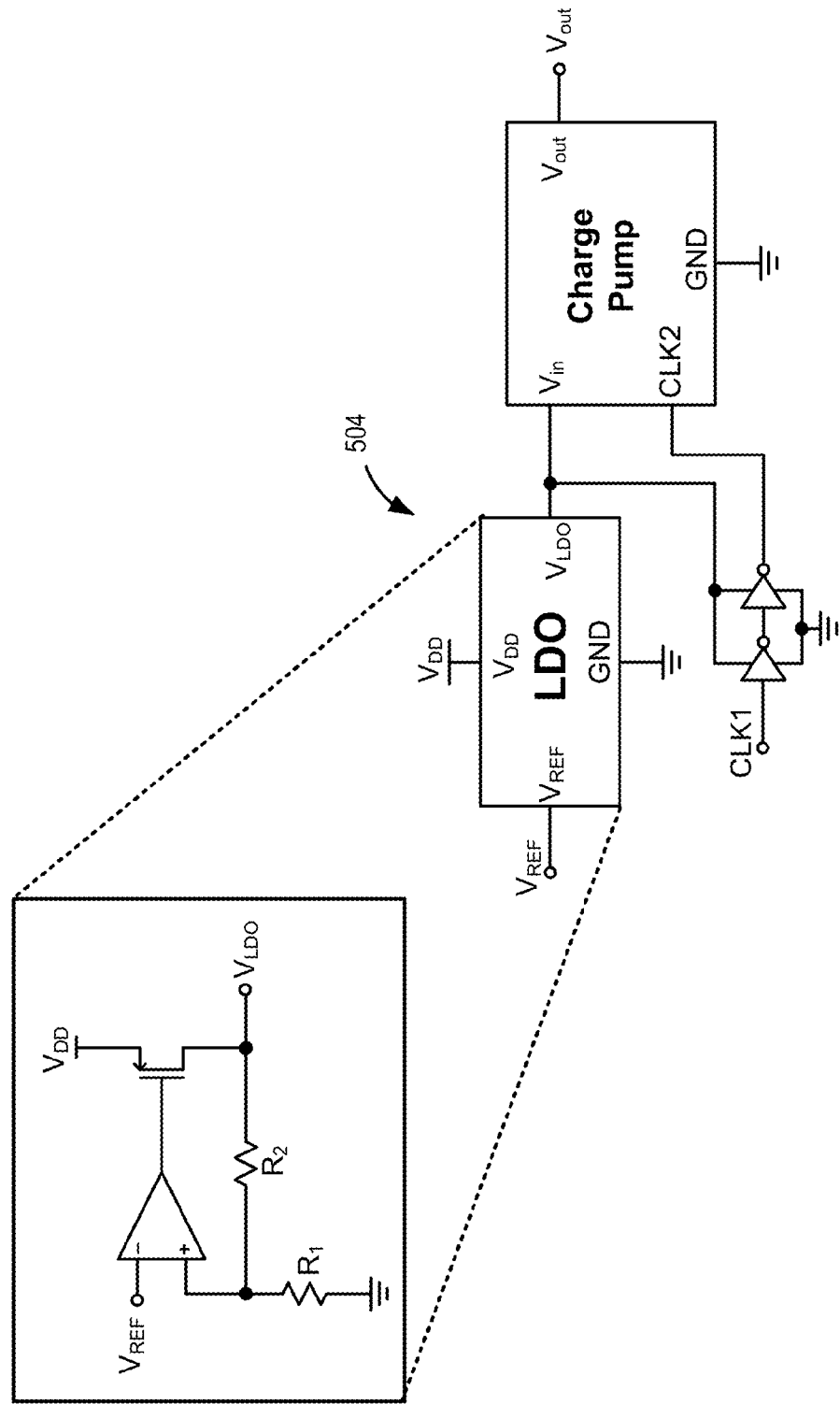
FIG. 5 shows an embodiment of a variable charge pump configuration.

With reference to FIG. 5, a variable charge pump configuration is now described. For such embodiments, the output voltage of the charge pump can be programmed by controlling the number of stages, N, and the input voltage ($V_{in}$). Controlling the number of stages is generally a complex process and will only result in discrete programmable steps in the output voltage. Thus, various embodiments provide fine tuning of the output voltage through adjustment of the input voltage ($V_{in}$) for a given number of stages. The input voltage is obtained from the low-dropout (LDO) regulator circuit 504. FIG. 5 shows one possible implementation of the LDO regulator circuit 504. The LDO regulator output voltage is expressed as:

$$V_{LDO} = \left(1 + \frac{R_2}{R_1}\right) V_{ref}. \quad (4)$$

Therefore, if we set $R_1=R_2$ and by varying $V_{ref}$ from 0 to 2.5V, the LDO regulator output voltage is controlled from 0 to 5V. By changing $V_{ref}$ from 0 to 2.5V, $V_{LDO}$ varies up to 5V, and the output voltage ($V_{out}$) varies with $V_{ref}$.

Figure 6:
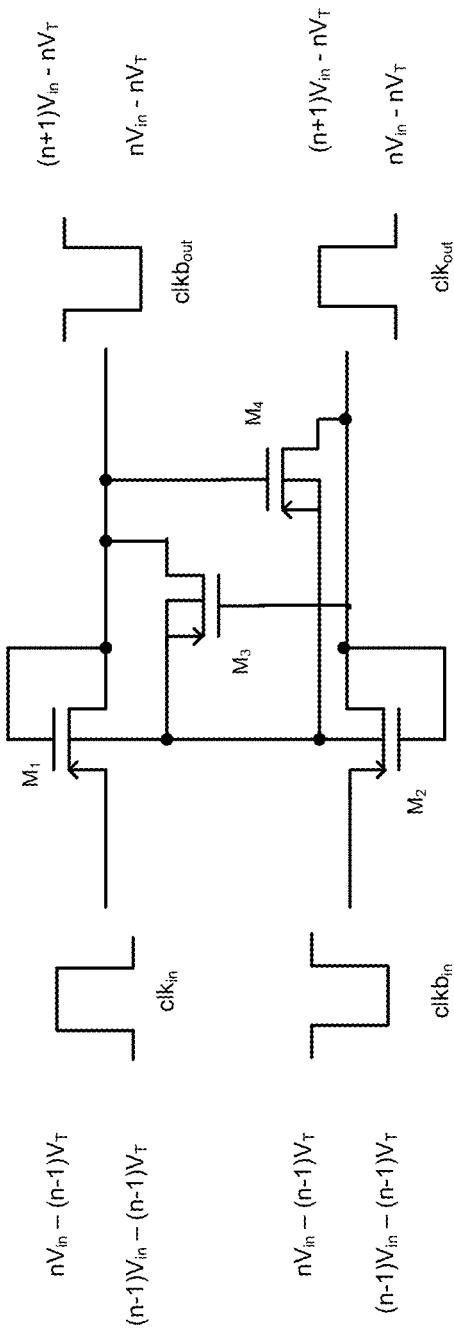
FIG. 6 illustrates an embodiment of all-PMOS switching stage used in the charge pump configuration.

Having described the basic framework for a charge pump configuration utilizing high-density low-voltage capacitors, various implementations of the switching stage are now described. In accordance with some embodiments, the switching stage is implemented without voltage threshold ($V_T$) loss elimination ($\delta=V_T$). Alternative embodiments are also described in which a $V_T$ loss elimination technique ($\delta=0$) is implemented to produce a higher voltage with fewer stages. As described in more detail below, this may be accomplished by coupling a clock level shifting circuit to the charge pump stages, where the clock level shifting circuit is configured to generate a differential clock signal for a clock input and a clock input inverse of the first switching stage among the plurality of switching stages. For some embodiments, the differential clock signal ranges from approximately 0V to 2Vin. For some embodiments, a charge pump configuration is implemented using PMOS technology. Shown in FIG. 6 is an all-PMOS switching stage used in the charge pump configuration. Generally, utilizing all-PMOS switching stages results in a loss of $V_T$ at each stage.

Figure 7:
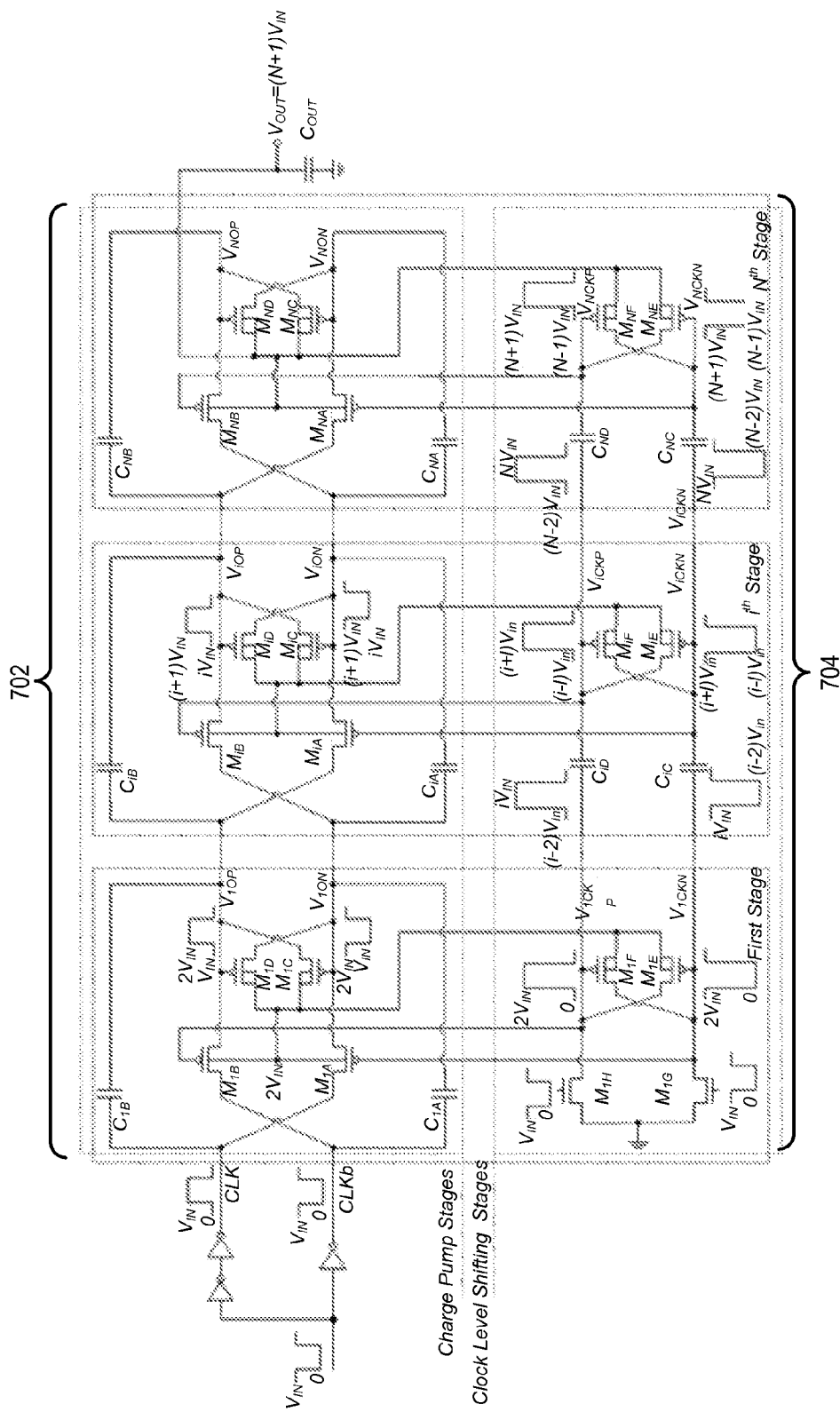
FIG. 7 illustrates an embodiment of a series-capacitor charge pump with ohmic switches (SCCP-OS) for achieving a zero open-circuit voltage drop in each stage in accordance with various embodiments of the present disclosure.

In accordance with various embodiments of the charge pump circuit described, a series-capacitor charge pump with ohmic switches (SCCP-OS) may be implemented in order to achieve a zero open-circuit voltage drop ($\delta=0$) in each stage, as depicted in FIG. 7. To achieve a zero open-circuit voltage drop, the voltage swing at the gates of the PMOS transistors is set higher than the input voltage, $V_{IN}$. A clock level shifting circuit 704 comprising $M_{1E}$, $M_{1F}$, $M_{1G}$, and $M_{1H}$ is utilized in the first stage to generate differential clocks with a 0 to $2V_{IN}$ swing. This high swing clock is used to drive the PMOS switches of the first stage in the charge pump circuit 702. The high swing clock is also used to drive the level shifting circuits of the second stage, composed by transistors $M_{2E}$ and $M_{2F}$, and capacitors $C_{2C}$ and $C_{2D}$. The second stage in the clock level shifter 704 generates differential output clocks with a $V_{IN}$ to $3V_{IN}$ swing, which are suitable for driving the second stage of the charge pump 702 and the third stage of the clock level shifter 704, and so on.

The clock levels produced by the clock level shifter 704 can be translated to $V_{SL}=0$ and $V_{SH}=2V_{IN}$ which satisfy the following conditions below ((5) and (6)):

$$V_{SL} < V_{IN} - V_T \quad (5)$$

To ensure that $M_{1A}$ is turned OFF, the following condition must be met:

$$V_{SH} > 2V_{IN} - \delta - V_T. \quad (6)$$

Figure 8:
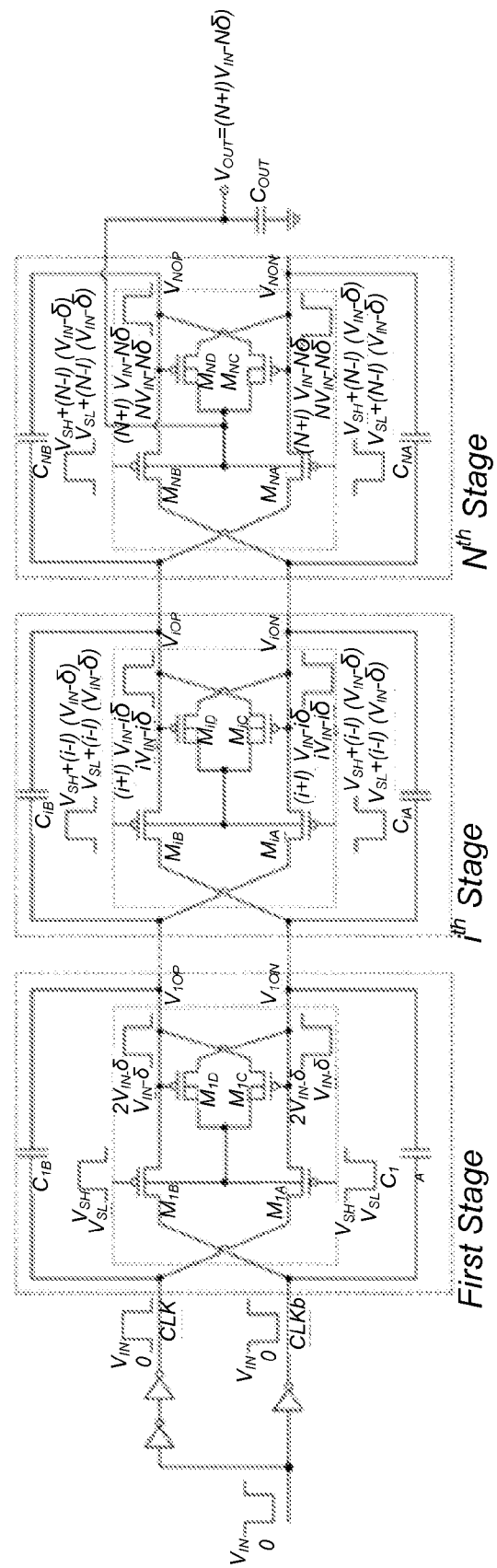
FIG. 8 illustrates an implementation of the charge pump circuit where the gate voltage waveforms of the PMOS transistors are expressed in terms of $V_{SL}$ and $V_{SH}$.

For the expressions above, the gate voltage waveforms of the PMOS transistors $M_{iA}$ and $M_{iB}$ are expressed in terms of $V_{SL}$ and $V_{SH}$, where transistors $M_{iA}$ and $M_{iB}$, are shown in the basic charge pump configuration shown in FIG. 8. As described earlier, the output of each stage is used as the pumping clock for the next stage. The operation of the proposed charge pump can be described, assuming zero load current and no parasitics capacitances, as follows: when CLK=0 and $CLK_b=V_{IN}$, transistors $M_{1A}$ and $M_{1B}$ turn OFF and ON, respectively. Furthermore, $V_{1OP}=V_{IN}-\delta$, where $\delta$ is the voltage drop across the PMOS switch $M_{1B}$. The value of $\delta$ depends on region of operation of the PMOS switch when it is turned ON. A necessary condition for zero voltage drop ($\delta=0$) at zero load current, is to force the PMOS transistor to operate in the ohmic region.

Referring back to the embodiment of the SCCP-OS configuration depicted in FIG. 7, the voltage across the clock level shifting capacitors $C_{iC}$ and $C_{iD}$ is limited to $V_{IN}$ and low voltage capacitors may be utilized. The use of normal NMOS transistors in a Dickson charge pump forces the bulk terminals of the different transistors to be connected to ground. As a result, the body effect causes the threshold voltage of the NMOS transistor to increase from stage to stage. At some point, when $V_{tN}$ becomes higher than $V_{IN}$, the output voltage starts decreasing as N increases and this point represents the maximum attainable output voltage for this specific circuit architecture.

With the latter in mind, PMOS transistors are utilized as the switching pair because the bulk of each transistor may be connected separately. However, the bulk of the PMOS transistor cannot be connected directly to the source because the source voltage is higher than the drain voltage in one clock phase and lower in the other. This problem is addressed in the charge pump configuration shown in FIG. 7 by using transistors $M_{iG}$ and $M_{iH}$ in the clock level shifting stages. Transistors $M_{iG}$ and $M_{iH}$ select the maximum of the two output voltages of the $i^{th}$ stage (which is equal to $(i+1)V_{IN}$) and connect the selected maximum to the bulk of the PMOS transistors in this stage.

The gates of the transistors $M_{iC}$, $M_{iD}$, $M_{iE}$, and $M_{iF}$ are biased at $iV_{IN}$ (obtained from the $(i-1)^{th}$ stage). When $V_{(i-1)OP}$ is low at $(i-1)V_{IN}$ and $V_{iOP}$ is low at $iV_{IN}$ then $M_{iD}$ turns ON and $M_{iF}$ turns OFF. Therefore, the gate of $M_{iB}$ is set to $(i-1)V_{IN}$ to turn it ON and connect $V_{(i-1)ON}$ to $V_{iOP}$. When $V_{(i-1)OP}$ is high at $iV_{IN}$ and $V_{i-ON}$ is high at $(i+1)V_{IN}$, then $M_{iD}$ turns OFF and $M_{iF}$ turns ON. In this case, the gate of $M_{iB}$ is set to $(i+1)V_{IN}$ to turn it OFF. Therefore, the swing at the gate of $M_{iB}$ is $2V_{IN}$ (from $(i-1)V_{IN}$ to $(i+1)V_{IN}$) which is needed to eliminate the body effect. The same rationale may be applied for the swing at the gate of transistor $M_{i-2}$ of the $i^{th}$ stage.

Using this technique, the maximum voltage across any transistor is $2V_{IN}$, while the maximum PMOS body voltage occurs in the $N^{th}$ stage and is equal to $V_{OUT}$. However, this is not an issue since the breakdown voltage of n-well to p-substrate in the CMOS technology used is 70V. Note that the maximum voltage across any capacitor (with the exception of $C_{OUT}$) is $V_{IN}$, regardless of the number of stages. The output voltage for an N-stage charge pump, ignoring parasitic capacitors, may be expressed as: $V_{OUT}=(N+1)V_{IN}$. Again, by limiting the maximum voltage across the pumping capacitors, $C_{iA}$ and $C_{iB}$, low-voltage, high-density capacitors may be utilized in the circuit. Hence, the overall charge pump area, which is typically dominated by these capacitors, may be minimized. Note, however, that the output capacitor, $C_{OUT}$, still experiences the entire output voltage and thus a high-voltage capacitor is generally used for $C_{OUT}$. However, as the charge pump output is usually connected to a pin (for example, in order to be connected to a MEMS gyroscope), an external capacitor may be used for $C_{OUT}$.

Typically, parasitic capacitances of the pumping capacitors and the switching transistors cause power loss and ultimately, a reduction in the output voltage. To obtain a linearized model of the proposed charge pump disclosed herein, expressions for the open circuit output voltage and output impedance are derived. In the following discussion, an assumption is made that the switch turns ON in the ohmic region (e.g., as in the SCCP-OS) with a resistance, $R_S$, which is negligible compared to the pumping capacitors impedance at the switching frequency. Specifically, the following assumption is made:

$$\frac{1}{2\pi R_S C} \gg f_{CLK}. \tag{7}$$

The two phases of the pumping capacitors correspond to $\phi_1$ (CLK=$V_{DD}$) and $\phi_2$ (CLK=0). To take the effect of parasitic capacitors into consideration, each pumping capacitor is modeled as a floating capacitance, C, and a grounded parasitic capacitance, $C_S=\alpha C$, which represents the parasitic capacitor from the bottom plate to ground, where a is the ratio between the bottom plate parasitic capacitance and the floating capacitance. Based on this, the following expressions may be derived:

$$v_{1A}^{\phi_1}=V_{IN}; \text{ and} \tag{8}$$

$$v_{iA}^{\phi_1}=v_{i-1B}^{\phi_1} \text{ for } i=2,3,\ldots N, \tag{9}$$

where $v_{iA}^{\phi_1}$ and $v_{iB}^{\phi_1}$ represent the voltages at the end of phase $\phi_1$ across the capacitors $C_{iA}$ and $C_{iB}$, respectively. By considering charge conservation when switching from $\phi_2$ to $\phi_1$, the following may be derived:

$$v_{iB}^{\phi_1}=v_{iA}^{\phi_1}-2v_{i+1A}^{\phi_1}+v_{i+2A}^{\phi_1}-\alpha v_{iB}^{\phi_1}+(2+\alpha)v_{i+1B}^{\phi_1}-v_{i+2B}^{\phi_1}.$$

$$\text{for } i=1,2,\ldots N-2, \tag{10}$$

where the equations $v_{iA}^{\phi_2}=v_{iB}^{\phi_1}$ and $v_{iB}^{\phi_2}=v_{iA}^{\phi_1}$ (for i=1, 2, ..., N) are used from the problem symmetry. The expression above is not valid for i=N−1 and i=N. The remaining equations are:

$$v_{N-1B}^{\phi_1} = v_{N-1A}^{\phi_1} - v_{NA}^{\phi_1} - \alpha v_{N-1B}^{\phi_1} + v_{NB}^{\phi_1} - \frac{I_{OUT}}{2f_{clk}C}; \text{ and} \tag{11}$$

$$v_{NB}^{\phi_1} = v_{NA}^{\phi_1} - \frac{I_{OUT}}{2f_{clk}C}. \tag{12}$$

For the expressions above, the clock duty cycle is assumed to be 50%. The equations above may be expressed in matrix form, as shown below:

$$V_A^{\phi_1} = M_{AB}V_B^{\phi_1} + K_1 V_{IN} \tag{13}$$

$$V_B^{\phi_1} = M_{BA}V_A^{\phi_1} + M_{BB}V_B^{\phi_1} - K_2\frac{I_{OUT}}{2f_{clk}C}, \tag{14}$$

where $V_B^{\phi_1}=[v_{1B}^{\phi_1}\ v_{2B}^{\phi_1}\ \ldots\ v_{NB}^{\phi_1}]$, $V_A^{\phi_1}=[v_{1A}^{\phi_1}\ v_{2A}^{\phi_1}\ \ldots\ v_{NA}^{\phi_1}]$, $K_1^T=[1\ 0\ 0\ \ldots\ 0]$, and $K_2^T=[0\ 00\ \ldots\ 0\ 1\ 1]$. The matrices $M_{AB}$, $M_{BA}$, and $M_{BB}$ are expressed as:

$$M_{AB} = \begin{bmatrix} 0 & 0 & 0 & \ldots & 0 & 0 & 0 \\ 1 & 0 & 0 & \ldots & 0 & 0 & 0 \\ 0 & 1 & 0 & \ldots & 0 & 0 & 0 \\ \vdots & \vdots & \vdots & \ddots & \vdots & \vdots & \vdots \\ 0 & 0 & 0 & \ldots & 1 & 0 & 0 \\ 0 & 0 & 0 & \ldots & 0 & 1 & 0 \end{bmatrix}$$

$$M_{BA} = \begin{bmatrix} 1 & -2 & 1 & 0 & \ldots & 0 & 0 & 0 \\ 0 & 1 & -2 & 1 & \ldots & 0 & 0 & 0 \\ 0 & 0 & 1 & -2 & \ldots & 0 & 0 & 0 \\ \vdots & \vdots & \vdots & \vdots & \ddots & \vdots & \vdots & \vdots \\ 0 & 0 & 0 & 0 & \ldots & 1 & -2 & 1 \\ 0 & 0 & 0 & 0 & \ldots & 0 & 1 & -1 \\ 0 & 0 & 0 & 0 & \ldots & 0 & 0 & 1 \end{bmatrix}$$

$$M_{BB} = \begin{bmatrix} -\alpha & 2+\alpha & -1 & \ldots & 0 & 0 & 0 \\ 0 & -\alpha & 2+\alpha & \ldots & 0 & 0 & 0 \\ 0 & 0 & -\alpha & \ldots & 0 & 0 & 0 \\ \vdots & \vdots & \vdots & \ddots & \vdots & \vdots & \vdots \\ 0 & 0 & 0 & \ldots & -\alpha & 2+\alpha & 1 \\ 0 & 0 & 0 & \ldots & 0 & -\alpha & 1 \\ 0 & 0 & 0 & \ldots & 0 & 0 & 0 \end{bmatrix}$$

The solution of the above matrix equations is expressed as:

$$V_B^{\phi_1} = (I - M_{BB} - M_{BA}M_{AB})^{-1}; \text{ and} \tag{15}$$

$$\left(M_{BA}K_1 V_{IN} - K_2\frac{I_{OUT}}{2f_{clk}C}\right), \tag{16}$$

where I is the N×N unity matrix. The output voltage of the charge pump at the end of $\phi_1$ is expressed as:

$$V_{OUT}^{\phi_1}=V_{IN}+K_3 V_B^{\phi_1}=A_V V_{IN}-R_{OUT}I_{OUT}, \tag{17}$$

where $K_3=[1\ 1\ \ldots\ 1\ 1]$. From the problem symmetry, this is the same as the output voltage at the end of $\phi_2$ (i.e., $V_{OUT}^{\phi_1}=V_{OUT}^{\phi_2}$). The open-circuit voltage gain, $A_V$, and the slow switching limit (SSL) output resistance, $R_{OUT}$, are obtained based on the following expressions:

$$A_V = 1 + K_3[(I - M_{BB} - M_{BA}M_{AB})^{-1}M_{BA}K_1]; \tag{18}$$

$$R_{OUT} = \frac{\text{sum}[(I - M_{BA}M_{AB} - M_{BB})^{-1}K_2]}{2f_{clk}C}. \tag{19}$$

Figure 9:
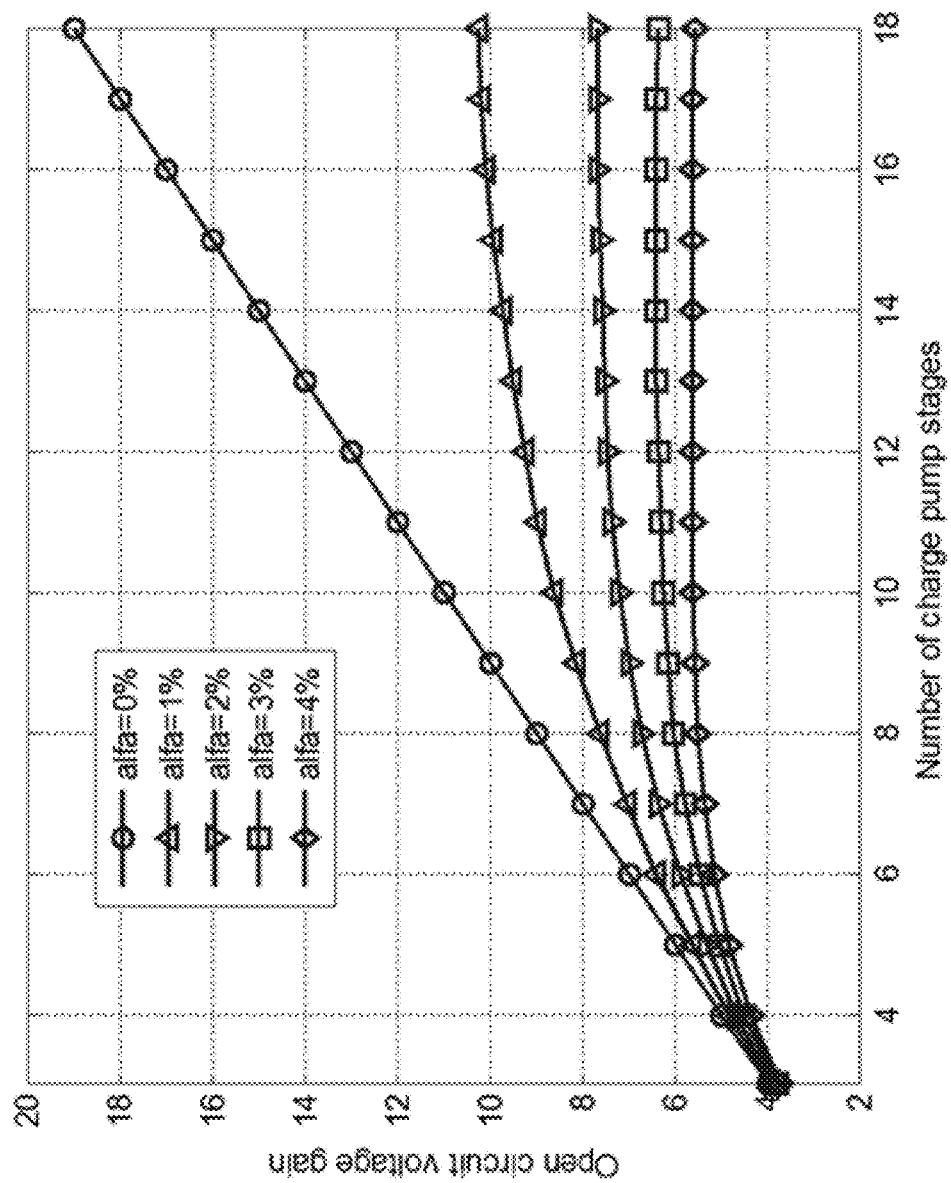
FIG. 9 is a plot of the open-circuit voltage gain versus the number of charge pump stages corresponding to the charge pump circuit of FIG. 8.

With reference to FIG. 9, the open-circuit voltage gain $A_V$ versus the number of charge pump stages, N, for different values of α is shown. The ideal voltage gain for α=0 is equal to N+1, as expected. Note that as the value of α increases, the open-circuit voltage gain drops due to parasitic capacitors dynamic losses. The dynamic loss increases with the number of stages for a given α. Note also that the open-circuit voltage gain reaches a maximum value as N increases after which the open-circuit voltage starts to decrease slowly as N is increased further.

Figure 10:
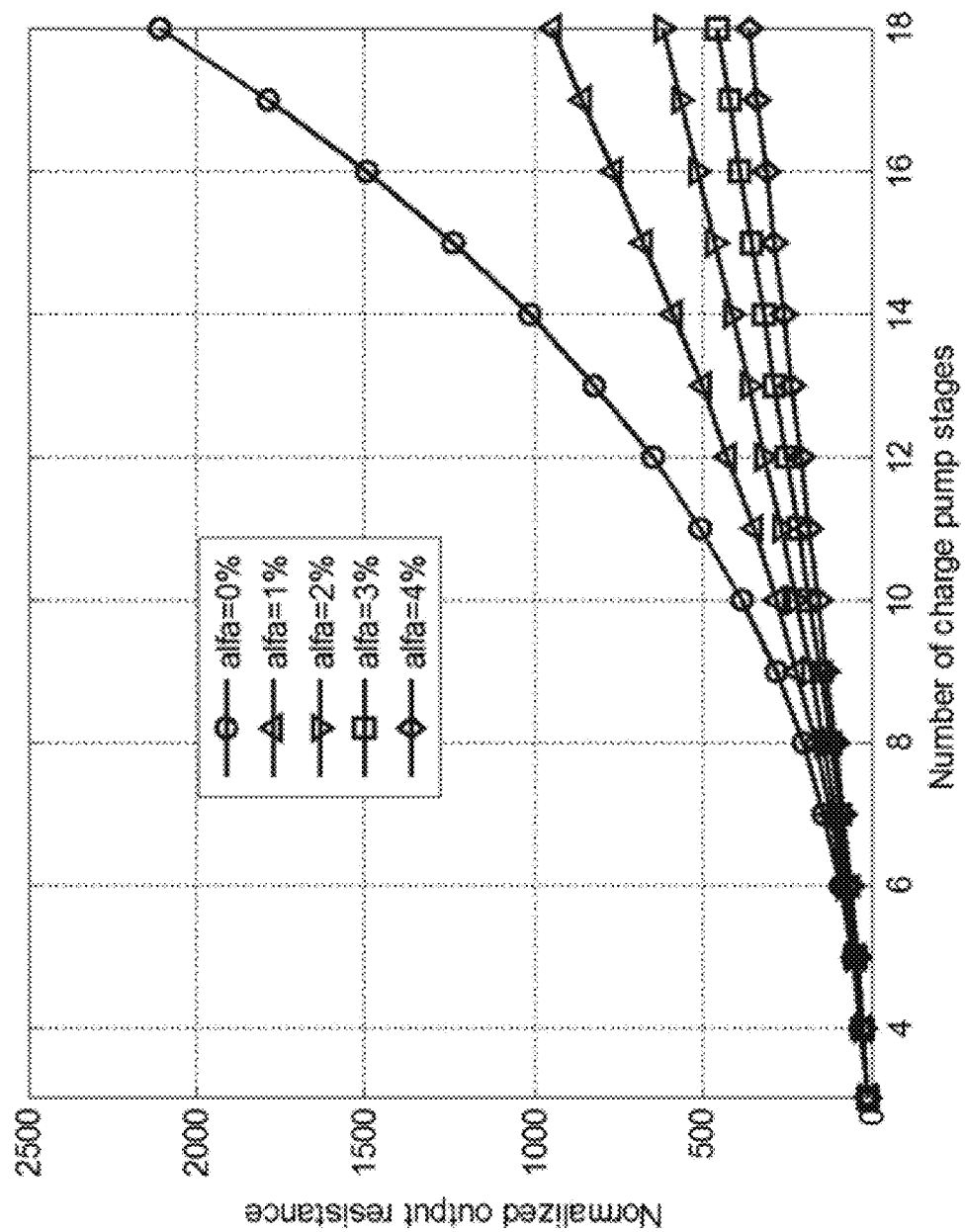
FIG. 10 is a plot of the normalized slow switching limit (SSL) output resistance corresponding to the charge pump circuit of FIG. 8.

The normalized SSL output resistance, $R_{OUT}=2f_{clk}CR_{OUT}$, is plotted in FIG. 10. Note that $R_{OUT}$ decreases with a and increases with N. It should be emphasized, however, that that the output voltage does not necessarily increase for a given load current when more parasitics are present. Rather, for a given load current, the open-circuit voltage decreases and the output resistance decreases as α increases. The net result is a decrease in the actual output voltage. This is verified by plotting the output voltage for $I_{OUT}=1$ μA, C=100 pF, and $V_{IN}=5V$ as shown in FIG. 10.

To complete the two-port model of the charge pump, an expression for the input current, $I_{IN}$, is derived. In particular, this current may be expressed as follows:

$$1I_{IN} = 2f_{clk}C\left[\left(v_{1A}^{\phi_1} - v_{1A}^{\phi_2}\right) - \left(v_{2A}^{\phi_1} - v_{2A}^{\phi_2}\right) - \left(v_{1B}^{\phi_1} - v_{1B}^{\phi_2}\right) + \alpha V_{IN} + \alpha\left(V_{IN} - v_{2A}^{\phi_2}\right)\right] \quad (20)$$

$$= K_4 V_A^{\phi_1} + K_5 V_B^{\phi_1} + 2\alpha V_{IN}, \quad (21)$$

where $K_4=[2\ -1\ 0\ 0\ \ldots\ 0]$ and $K_5=[-2\ 1\ -\alpha\ 0\ 0\ \ldots\ 0]$. Based on the expression above, the following expressions may be derived:

$$I_{IN}=Y_{IN}V_{IN}+\beta I_{OUT}, \text{where} \quad (22)$$

$$Y_{IN}=2f_{clk}C[(K_4M_{AB}+K_5)(I-M_{BB}-M_{BA}M_{AB})^{-1}, \quad (23)$$

$$M_{BA}K_1+K_4K_1+2\alpha], \text{and} \quad (24)$$

$$\beta=-(K_4M_{AB}K_5)(I-M_{BB}-M_{BA}M_{AB})^{-1}K_2. \quad (25)$$

The power conversion efficiency may be expressed as:

$$\eta = \frac{I_{OUT}(A_V V_{IN} - R_{OUT}I_{OUT})}{V_{IN}(Y_{IN}V_{IN} + \beta I_{OUT})} \times 100\%. \quad (26)$$

Figure 11:
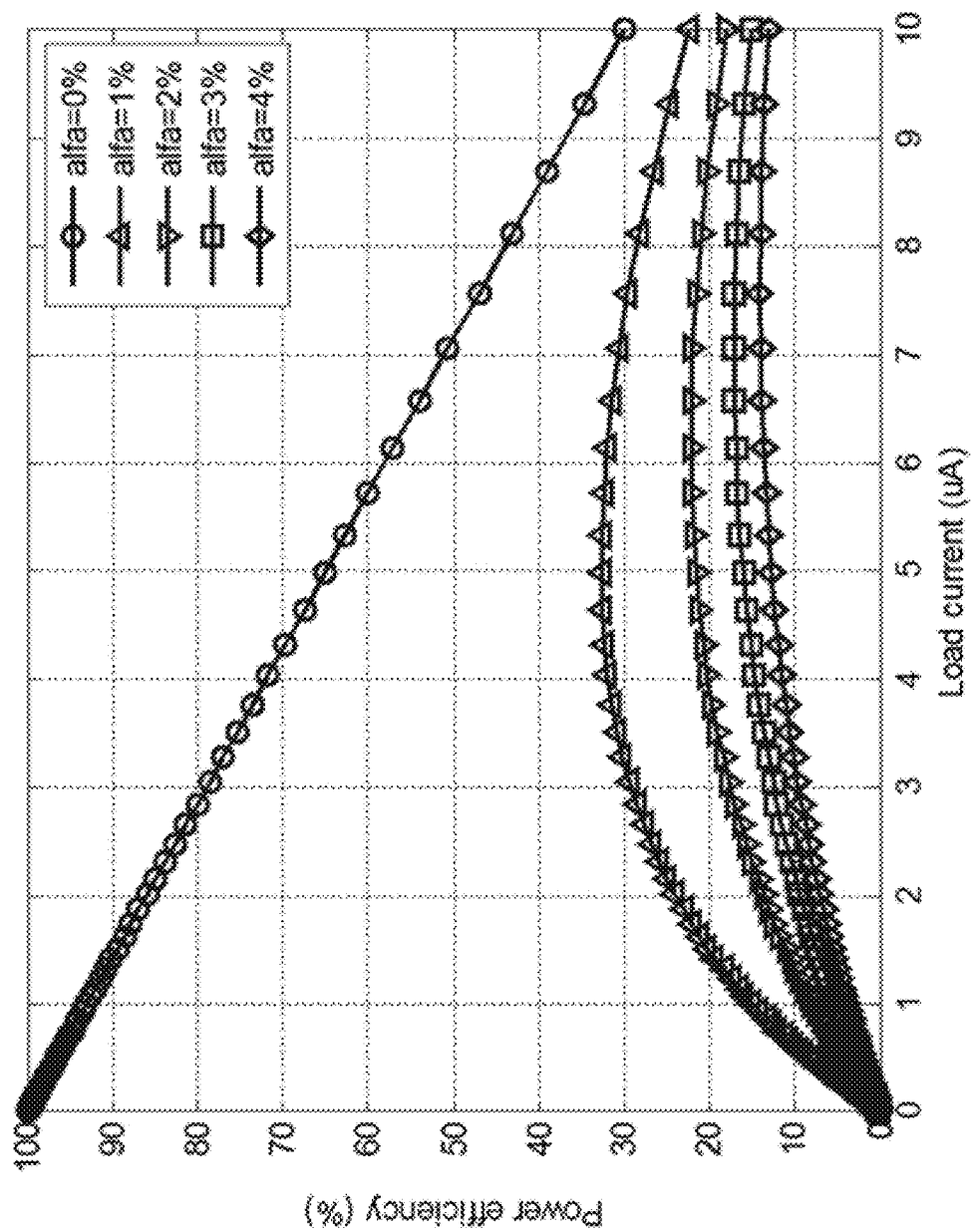
FIG. 11 is a plot of power efficiency versus the load current corresponding to the charge pump circuit of FIG. 8.

The power efficiency is plotted versus the load current for N=10 in FIG. 11. The efficiency is expected to be close to 100% for a very small load current (negligible charge transfer losses) at α=0 (ideal capacitors). The output voltage ripple may be obtained by finding the high-frequency output capacitance of the charge pump during $\phi_1$ or $\phi_2$, which may be expressed as:

$$C_{OUT} = C_N = \frac{C}{1+\frac{1}{\alpha + C_{N-1}/C}}, \text{and} \quad (27)$$

$$C_i = \frac{2C}{1+\frac{1}{\alpha + C_{i-1}/2C}} \text{ for } i = 2, 3, \ldots, N-1, \quad (28)$$

where $C_1=2C$. The equations above are solved to obtain $C_{OUT}$. The output voltage ripple for a load capacitor $C_L$ and an average load current $I_{OUT}$ is expressed as:

$$\Delta V_{OUT} = \frac{I_{OUT}}{2f_{clk}(C_{OUT} + C_L)}. \quad (29)$$

Figure 12A:
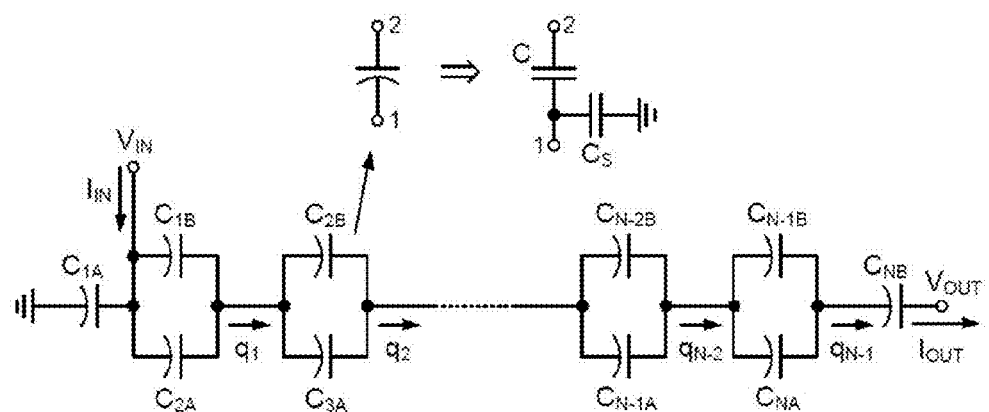
FIGS. 12A and 12B illustrate an embodiment of the pumping capacitor configuration that may be used with the charge pump architecture disclosed.
Figure 12B:
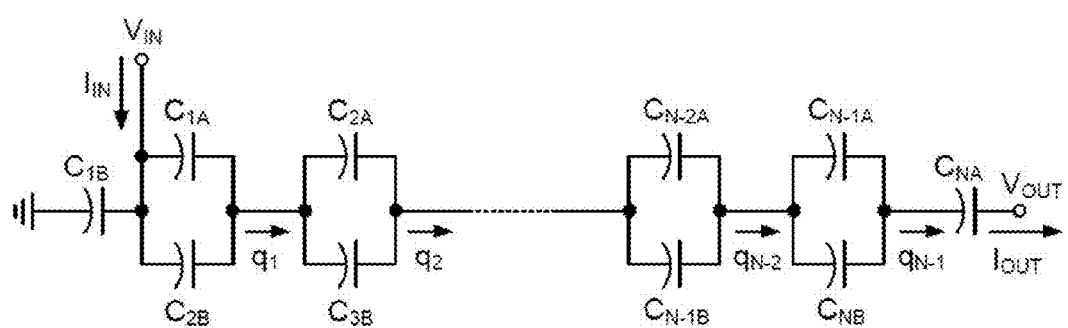

As illustrated in the discussion above, the open circuit output voltage of the proposed charge pump drops dramatically with the presence of parasitic capacitance from the pumping nodes to ground. Reference is made to FIGS. 12A and 12B, which illustrate an embodiment of the pumping capacitor configuration that may be used with the charge pump architecture disclosed.

Note, for example, that in $\phi_1$, charge sharing occurs between capacitors $C_{iBS}$ and $C_{(i+1)AS}$, for i=2, 3, . . . , N−1. Assuming an ideal voltage level at the stage, $C_{iBS}$ is charged to $iV_{IN}$ and $C_{(i+1)AS}$ is charged to $(i+2)V_{IN}$ during $\phi_2$. After charge sharing in $\phi_1$, $C_{iBS}$ is charged and $C_{(i+1)AS}$ to the same voltage level $(i+1)V_{IN}$. No extra charge is needed in this presumed condition to charge or discharge the parasitic capacitors. However, capacitor $C_{iBS}$ is discharged to ground during $\phi_2$ and is charged to $V_{IN}$ during $\phi_1$. The extra charge comes from the input voltage, which will affect power efficiency but should have no effect on open circuit voltage gain. Finally, the capacitor $C_{NBS}$ is ideally charged to $(N-1)V_{IN}$ during $\phi_2$ and is charged to $NV_{IN}$ during $\phi_1$. The extra charge comes from the output node, which results in dramatic degradation in the output voltage. To estimate the amount of this voltage loss, assume the floating capacitance has a value C=50 pF. At a clock frequency of 1 MHz, 4% parasitic capacitance, and $V_{IN}=5V$, the average current dissipated by $C_{NA}$ and $C_{NB}$ is 20 μA. For N=10, the equation below for $R_{OUT}$ results in $R_{OUT}=1.58M\Omega$ and the output voltage drops by approximately 31.6V, 57% from its ideal value of 55V:

$$R_{OUT} = \frac{\text{sum}[(I - M_{BA}M_{AB} - M_{BB})^{-1}K_2]}{2f_{clk}C}. \quad (30)$$

Thus, in order to prevent degradation of the open circuit voltage gain in the presence of the parasitic capacitance of pumping capacitors, capacitors $C_{NB}$ and $C_{NA}$ (implemented using poly0-poly1 layers) are shielded at the bottom by an nwell layer. The shield layer is connected to the clock signal with the same polarity of the capacitor top plate signal. Thus, the shield layer of $C_{NB}$ is connected to the CLK signal while the shield of $C_{NA}$ is connected to the CLKb signal.

Reference is made to FIGS. 13A and 13B, which illustrate the improved pumping capacitors connections in $\phi_1$ and $\phi_2$. The following holds true:

$$v_{N-1B}^{\phi_1} = v_{N-1A}^{\phi_1} - v_{NA}^{\phi_1} - \alpha v_{N-1B}^{\phi_1} + v_{NB}^{\phi_1} + \alpha V_{IN} - \frac{I_{OUT}}{2f_{clk}C}, \quad (31)$$

$$V_A^{\phi_1} = M_{AB}V_B^{\phi_1} + K_1 V_{IN}, \quad (32)$$

$$V_B^{\phi_1} = (I - M_{BB} - M_{BA}M_{AB})^{-1}, \text{ and} \quad (33)$$

$$\left(M_{BA}K_1V_{IN} + \alpha K_{2v}V_{IN} - K_2 \frac{I_{OUT}}{2f_{clk}C}\right), \quad (34)$$

where $K_{2v}^T=[0\ 0\ \ldots\ 0\ 1\ 0]$. Hence, the output voltage becomes:

$$V_{OUT}^{\phi 1} = V_{IN} + K_3 V_B^{\phi 1} = A_V V_{IN} - R_{OUT} I_{OUT}, \text{ where} \quad (35)$$

$$A_{V-imp} = 1 + (I - M_{BB} - M_{BA} M_{AB})^{-1}, \quad (36)$$

$$(M_{BA} K_1 + \alpha K_{2v}), \text{ and} \quad (37)$$

$$R_{OUT-imp} = \frac{K_2}{2 f_{clk} C} (I - M_{BB} - M_{BA} M_{AB})^{-1}. \quad (38)$$

Figure 14:
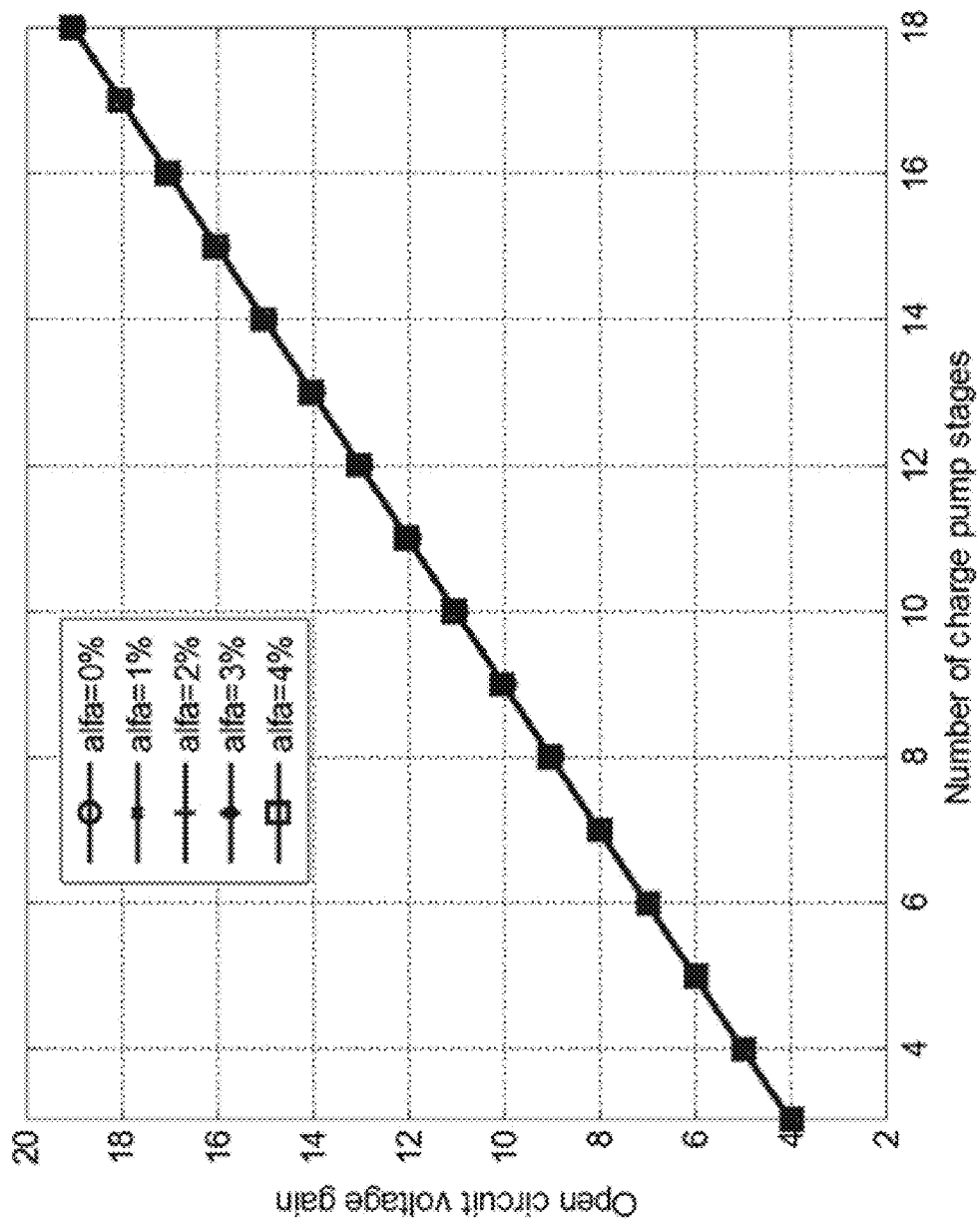
FIG. 14 shows the normalized voltage gain of the improved charge pump versus the number of stages.

While $R_{OUT}$ is unaffected by this modification, $A_v$ is significantly improved. FIG. 14 shows the normalized voltage gain of the improved charge pump versus the number of stages. With the assumption that the parasitic capacitances at the pumping nodes are only due to the bottom plate capacitances of the pumping capacitors, the normalized voltage gain in FIG. 14 is equal to the ideal gain. However, other parasitic capacitances (e.g., drain, source, and gate capacitances of MOS devices, wiring parasitics, etc.) are not considered in the above equations. If these parasitic capacitances are considered, the voltage gain equation $A_V = 1 + K_3[I - M_{BB} - M_{BA} M_{AB})^{-1} M_{BA} K_1]$ may be used by replacing $\alpha$ with the ratio of the remaining parasitic capacacitances (not including the bottom plate parasitic capacitance of the pumping capacitors) to the value of the pumping capacitors. This modified value of $\alpha$ can be made arbitrarily small by increasing the size of the pumping capacitors with respect to the size of the MOS switches.

In accordance with some embodiments, a SCCP with diode-connected switches (SCCP-DCS) may be implemented based on the charge pump architecture disclosed. With the SCCP-DCS, the gate voltages of $M_{iA}$ and $M_{iB}$ are connected to the output voltages, $V_{iON}$ and $V_{iOP}$, of the $i^{th}$ stage, respectively. This diode connection results in violating the condition ($V_{SL} < V_{IN} - V_T$) which gives rise to a voltage loss $\delta = V_T$ in each stage, with the exception of the last one. Note, however, that the condition ($V_{SH} > 2V_{IN} - \delta - V_T$) is still met since $V_{SH} = 2V_{IN} - V_T$. Despite the voltage loss, the circuits offers no more complexity (no extra transistors) other than the embodiment of the charge pump circuit shown in FIG. 4.

Figure 15:
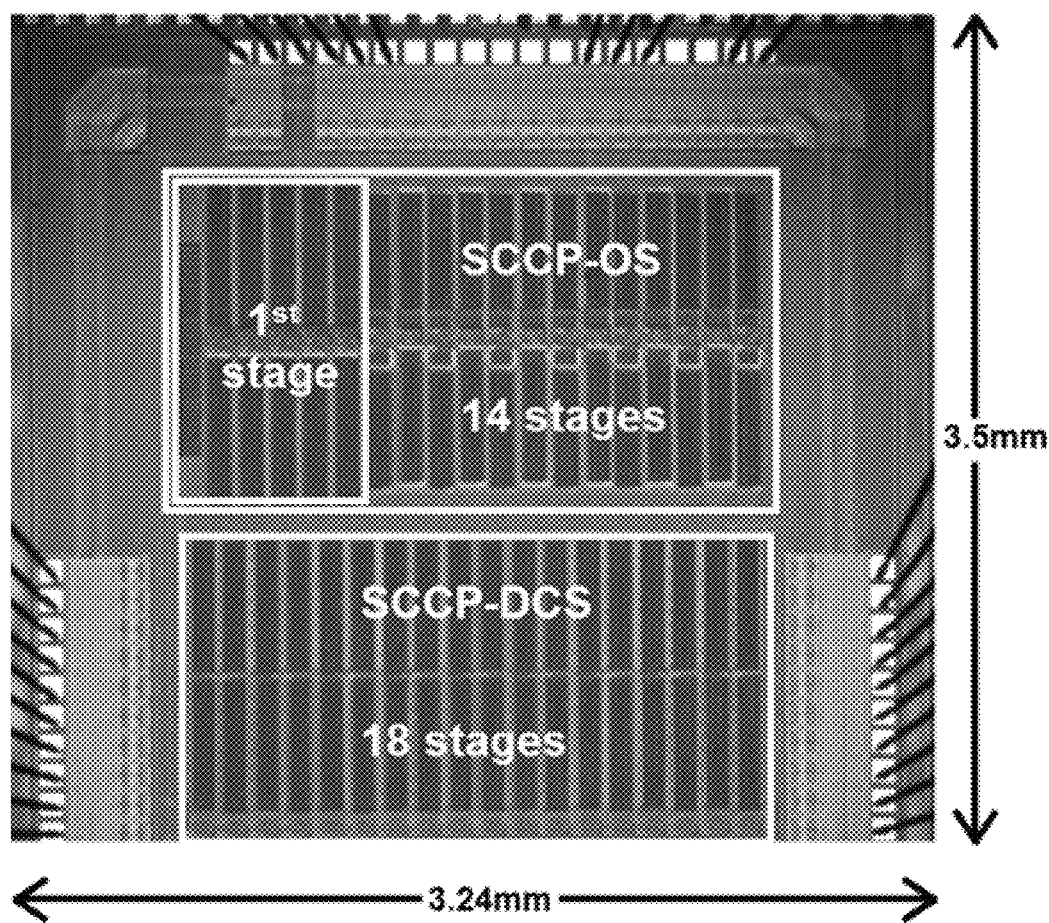
FIG. 15 shows the die photo of a fabricated chip containing the charge pump design in accordance with various embodiments of the present disclosure.

Having described the SCCP-DCS and SCCP-OS charge pump implementations, measurement results for the output voltage versus the load current are now discussed. For the measurement process, the charge pump circuits (SCCP-DCS and SCCP-OS) were fabricated in 0.6 µm CMOS technology. The technology provides high-voltage PMOS transistors with a minimum drain-substrate punch-through voltage of 70V and a typical threshold voltage of 0.97V. FIG. 15 shows the die photo of the fabricated chip for the charge pump in accordance with various embodiments. Note that the areas of the 18-stage SCCP-DCS and 14-stage SCCP-OS are 2.42 mm² and 2.86 mm², respectively. Puming capacitors (50 pF) were used for both charge pumps and 10 pF capacitors were used for clock level shifters of the SCCP-OS.

Figure 16:
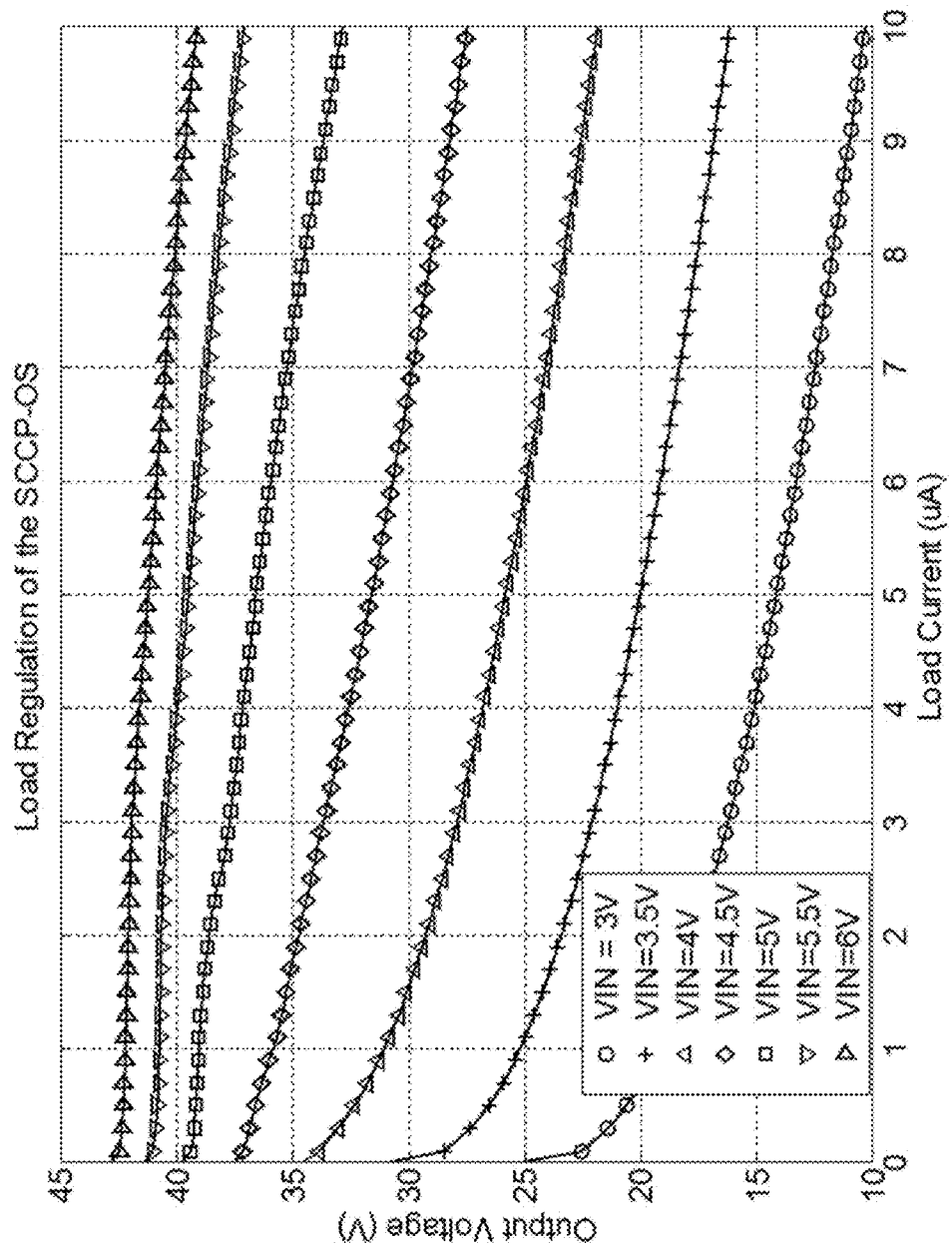
FIG. 16 shows measurement results for a 14-stage SCCP-OS.
Figure 17:
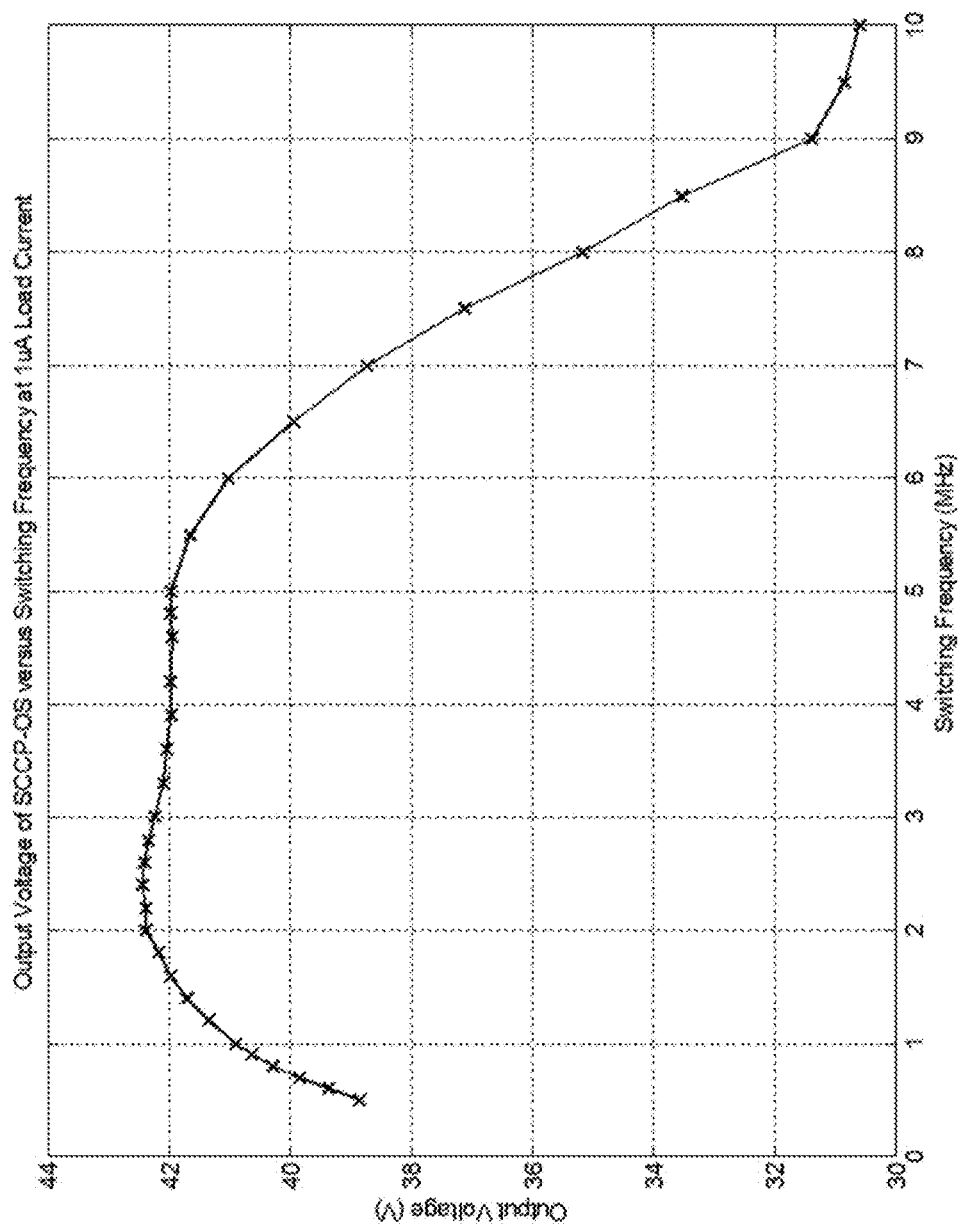
FIG. 17 shows the output voltage of the SCCP-OS versus the switching frequency.

Reference is made to FIG. 16, which depicts the measurement results for the 14-stage SCCP-OS. The first stage of the charge pump is designed with five times large pumping capacitances (250 pF) than following stages in order to drive the rest of the 13 stages, including the clock shifters. The output voltage of versus load current for different values of the input voltage is shown for a 2 MHz clock frequency. The output voltage reaches 42.8V when $V_{IN} = 6V$ at light loads. This measured open-circuit output voltage suggests that the equivalent parasitic capacitances (excluding capacitances associated with the bottom plate of the pumping capacitors) at the pumping nodes is approximately 3% of the pumping capacitances. The SSL output resistance is approximately 430 kΩ, which results from a total parasitics capacitances 14.5% (including bottom plate capacitances of the pumping capacitors). FIG. 17 shows the output voltage of the SCCP-OS versus the switching frequency at $I_{OUT} = 1 \mu A$ and $V_{IN} = 6V$. The output voltage peak voltage occurs at a clock frequency around 2.5 MHz while the curve is almost flat from 1.5 MHz to 5 MHz.

Figure 18:
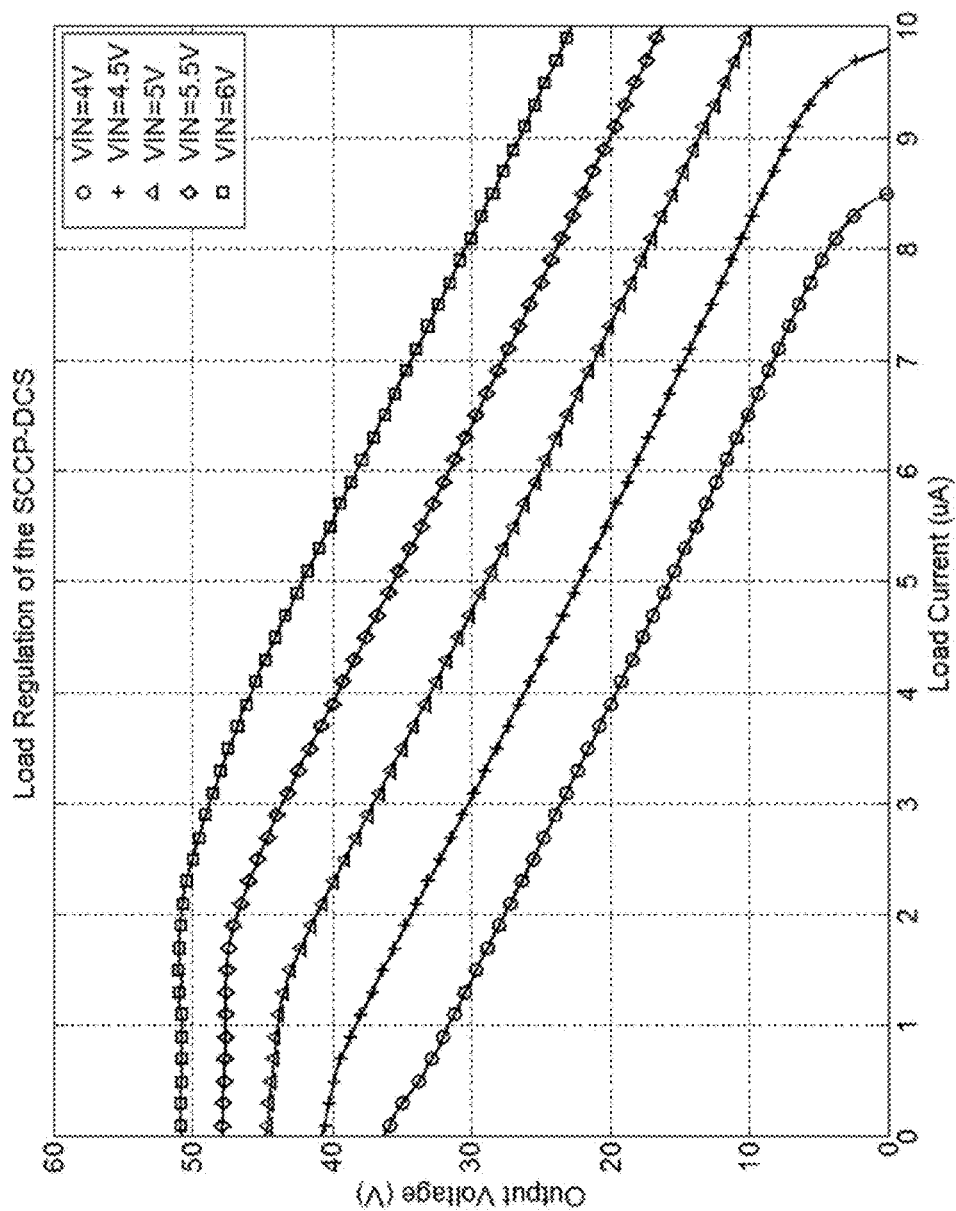
FIG. 18 shows the output voltage of a 18-stage SCCP-DCS versus the input current for different values of the input voltage.
Figure 19:
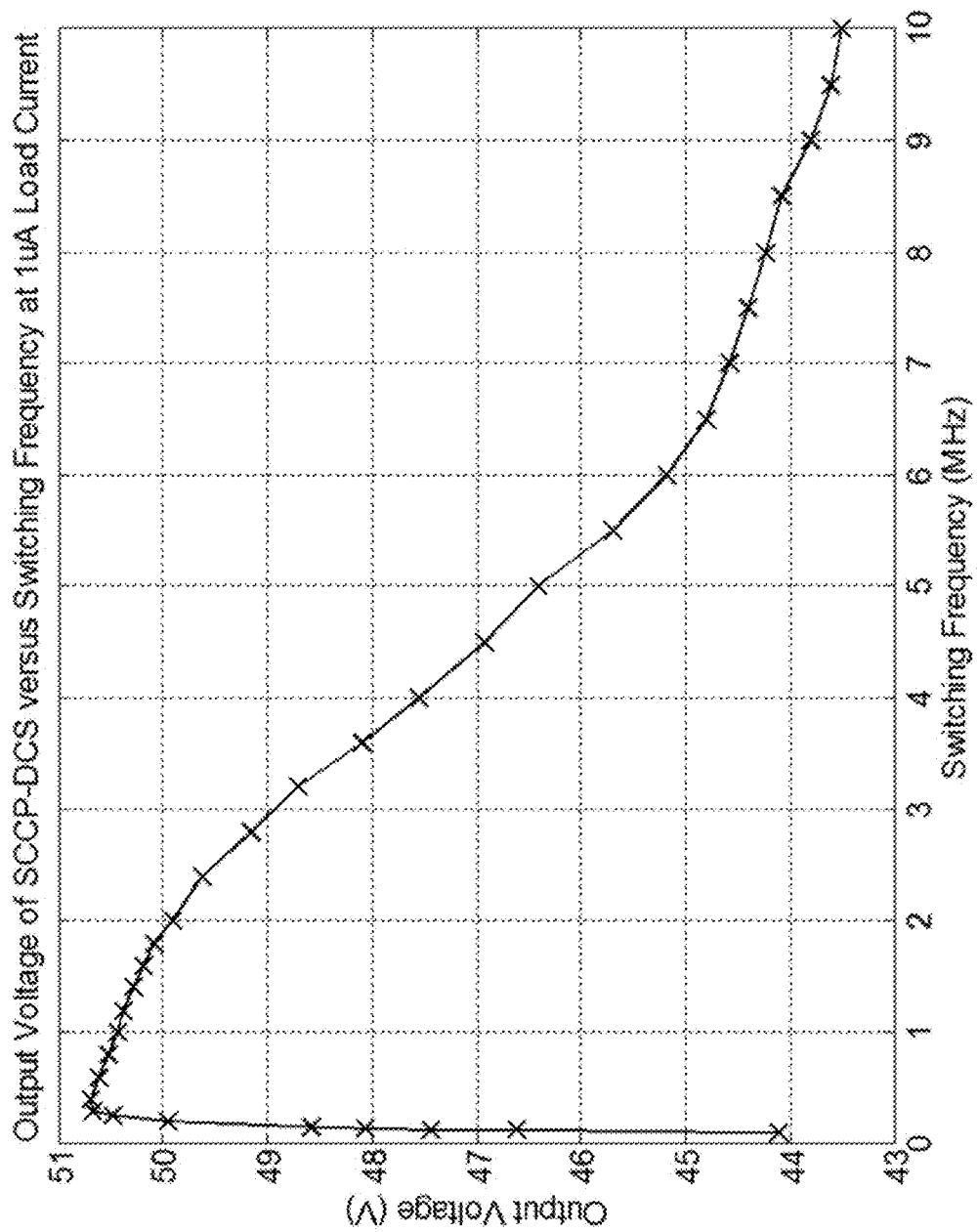
FIG. 19 shows the output voltage is plotted versus the clock frequency.

Reference is made to FIG. 18, which shows the output voltage of the 18-stage SCCP-DCS versus the input current for different values of the input voltage. The clock frequency was set to 500 kHz. The peak voltage reached Sly at $V_{IN} = 6V$. The output voltage is plotted versus the clock frequency in FIG. 19 for $I_{OUT} = 1 \mu A$ and $V_{IN} = 6V$. The peak voltage is reach at a clock frequency around 400 kHz. FIG. 20 is a table of the output voltage, load current capability, etc. of the charge pump configurations disclosed herein compared to other charge pump configurations.

Figure 21:
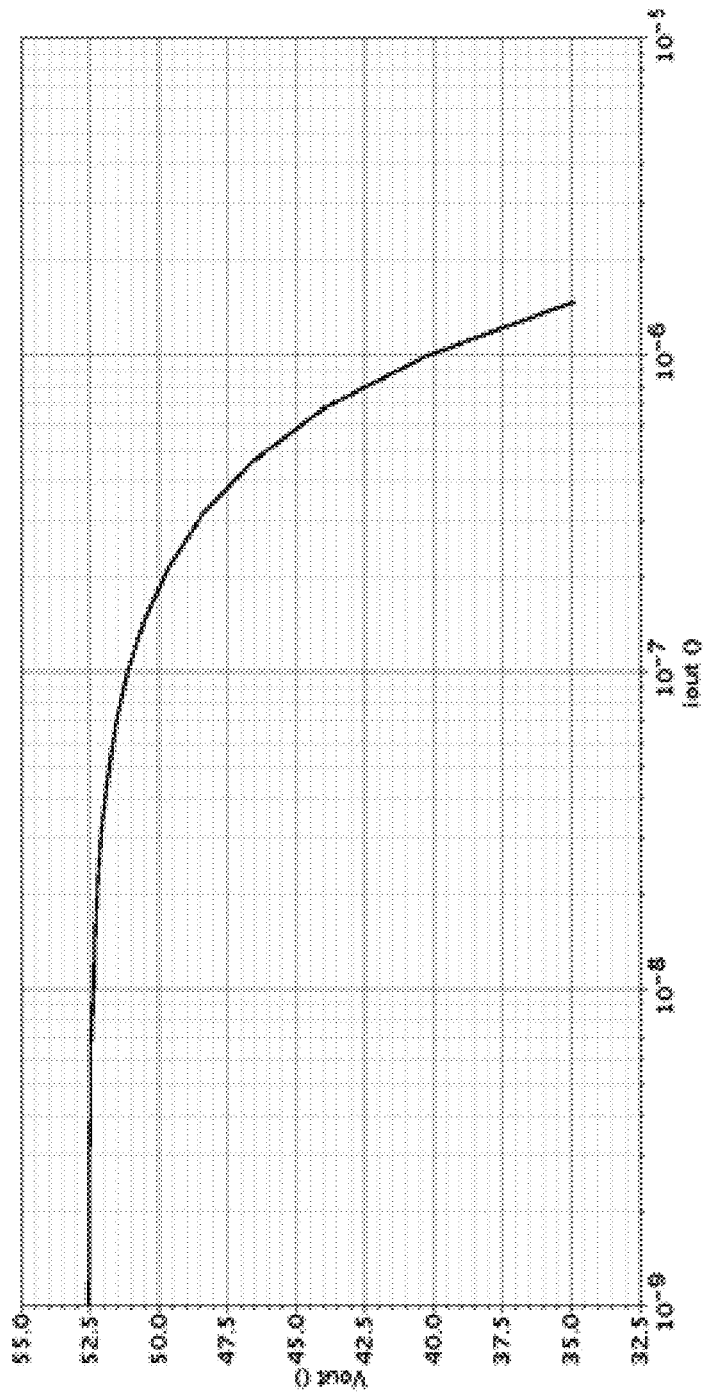
FIG. 21 illustrates the loading capacity of a simulated charge pump circuit.
Figure 22:
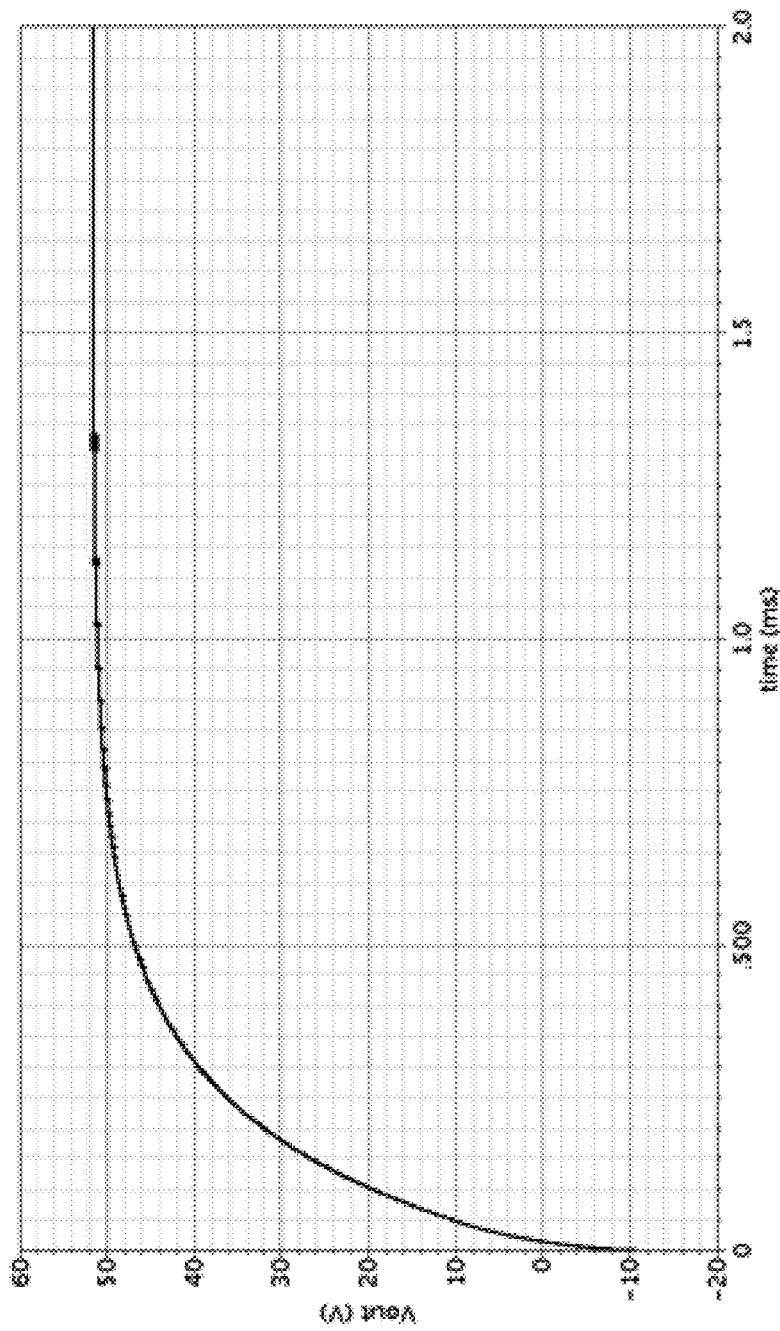
FIG. 22 shows the rise time of the output voltage for a simulated 18-stage charge pump.
Figure 23:
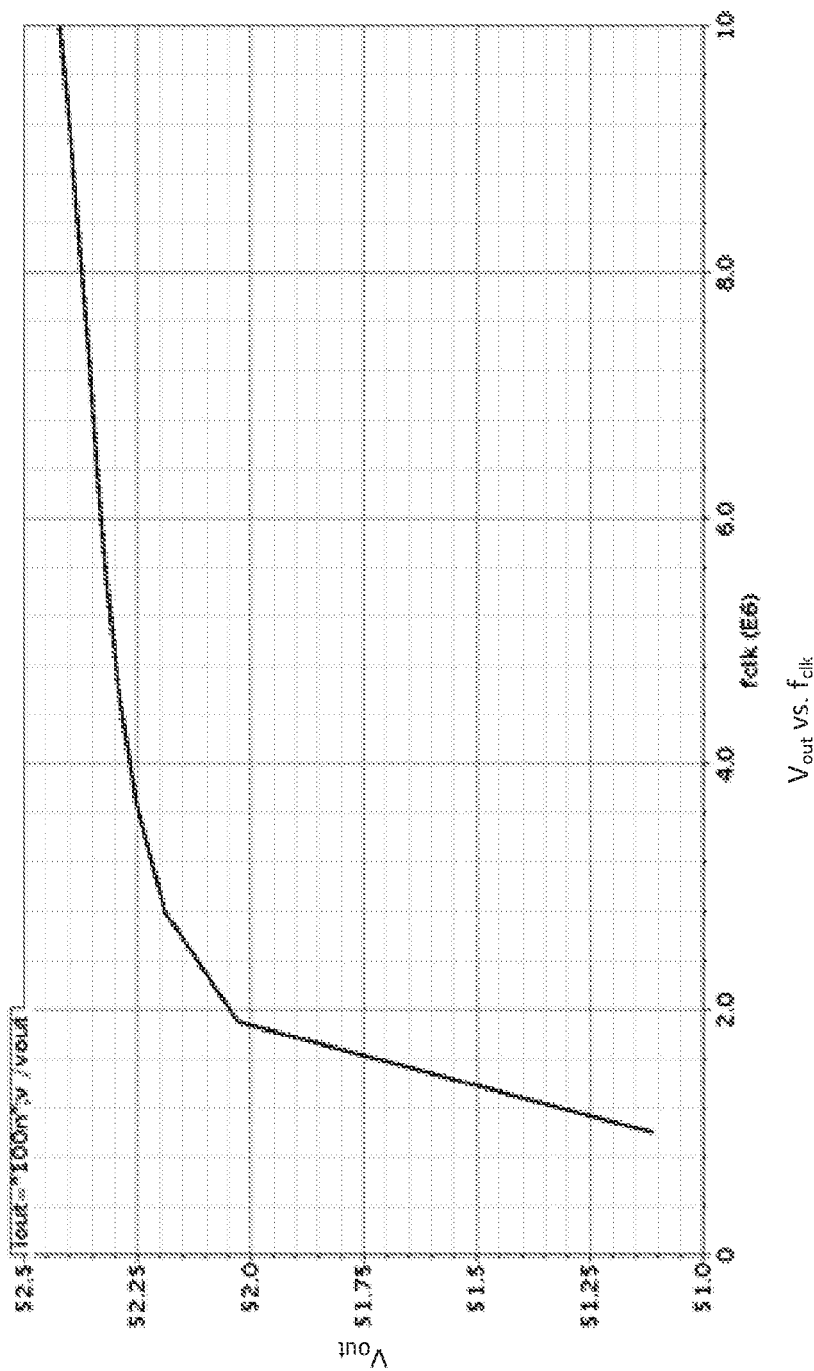
FIG. 23 is a plot of the output voltage ($V_{out}$) versus the clock frequency ($f_{clk}$) for a simulated charge pump configuration using PMOS switching stages.
Figure 24:
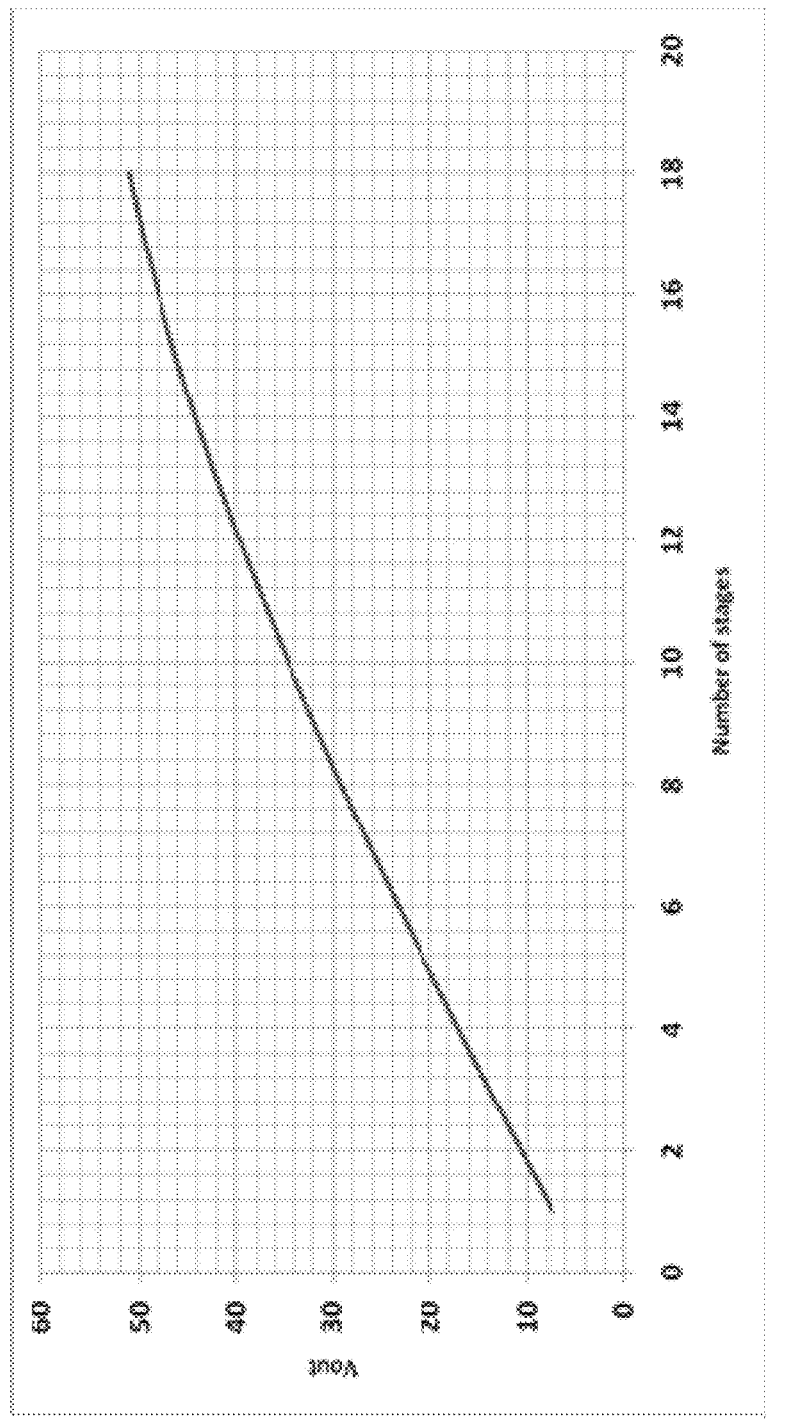
FIG. 24 shows the output voltage ($V_{out}$) versus the total number of switching stages in a simulated charge pump circuit.

FIGS. 21-28 show various simulation results relating to the all-PMOS switching stage shown in FIG. 6. Simulations were performed using a Spectre simulator under a Cadence environment. FIG. 21 illustrates the loading capacity of the circuit. As shown, the circuit can source up to 1 uA before the output voltage drops by 20 percent. FIG. 22 shows the output voltage of an 18-stage charge pump. Notably, the time for the voltage level to rise from 0V to 50V is only 0.7 ms, which is faster than the rise time associated with other conventional charge pump circuits. FIG. 23 is a plot of the output voltage ($V_{out}$) versus the clock frequency ($f_{clk}$) and illustrates the stability of the charge pump configuration using PMOS switching stages. Finally, FIG. 24 shows the output voltage ($V_{out}$) versus the total number of switching stages in the charge pump circuit.

Figure 25:
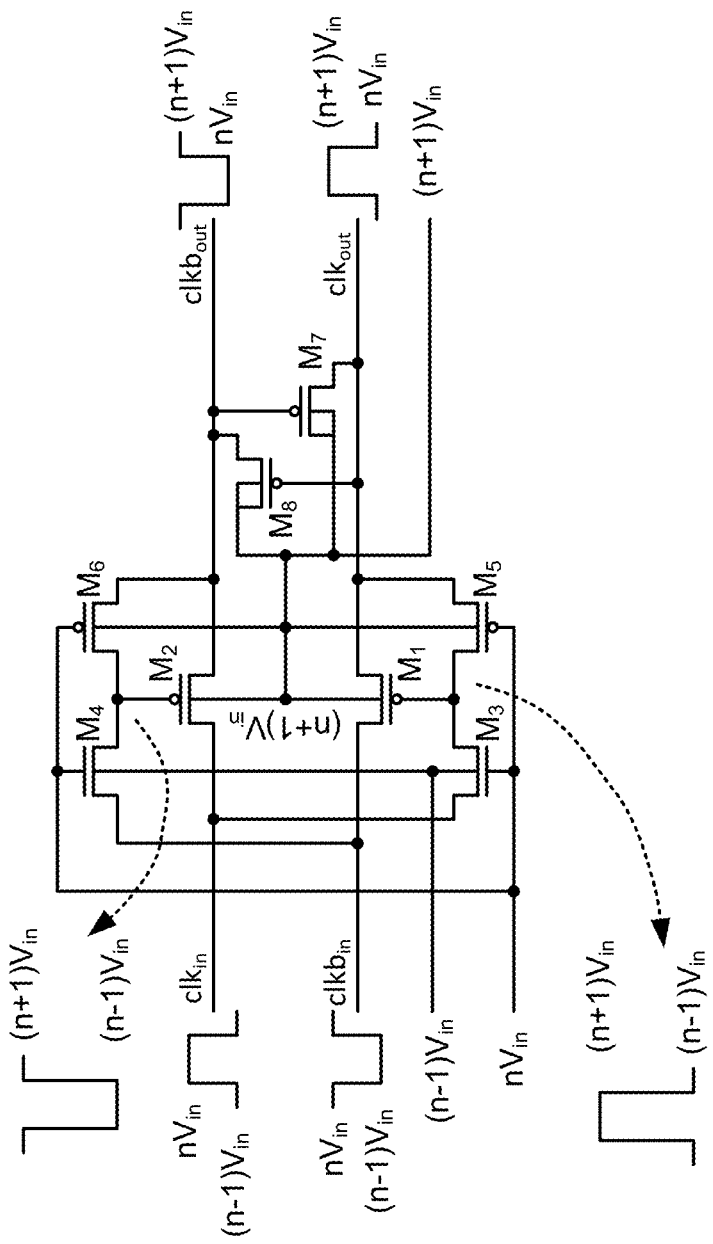
FIG. 25 depicts an embodiment wherein the switching stage is implemented with both n-type metal-oxide-semiconductor (NMOS) and PMOS transistors.

Reference is made to FIG. 25, which depicts an embodiment wherein the switching stage is implemented with both n-type metal-oxide-semiconductor (NMOS) and PMOS transistors. For such embodiments, when clk$_{in}$ switches from $(n-1)V_{in}$ to $nV_{in}$, clk$_{out}$ switches from $nV_{in}$ to $(n+1)V_{in}$ by the effect of the pumping capacitor in this stage (shown in FIG. 3). At the same time, clkb$_{in}$ switches from $nV_{in}$ to $(n-1)V_{in}$ which causes clkb$_{out}$ to switch from $(n+1)V_{in}$ to $nV_{in}$. Since the gates of M3, M4, M5, and M6 are connected to $nV_{in}$ which is obtained from the previous stage, transistors M3 and M6 turn OFF and transistors M4 and M5 turn ON. As a result, the gate of $M_2$ is connected to clkb$_{in}$ which is equal to $(n-1)V_{in}$ and $M_2$ turns ON. The signal clkb$_{out}$ is then connected to clkb$_{in}$ which is equal to $nV_{in}$. The gate of $M_1$ is connected to clkb$_{out}$ which is equal to $(n+1)V_{in}$ through $M_5$. Hence $M_5$ turns OFF.

Note that the bulk of the NMOS transistors $M_3$ and $M_4$ are connected to $(n-1)V_{in}$ which is the output of the second previous stage to avoid turning ON the parasitic diode between source and bulk of the NMOS transistor. Transistors $M_7$ and $M_g$ are used to select the maximum of the two output clocks in each phase (which is equal to $(n+1)V_{in}$) to generate the DC output and to use it to bias bulk terminals of $M_1$, $M_2$, $M_5$, and $M_6$. Similar analysis can be made at the falling edge of clk$_{in}$. Note that the voltage swing at the gates of $M_1$ and $M_2$ is equal to $2V_{in}$ which is needed to eliminate the threshold voltage loss in each stage.

Figure 26:
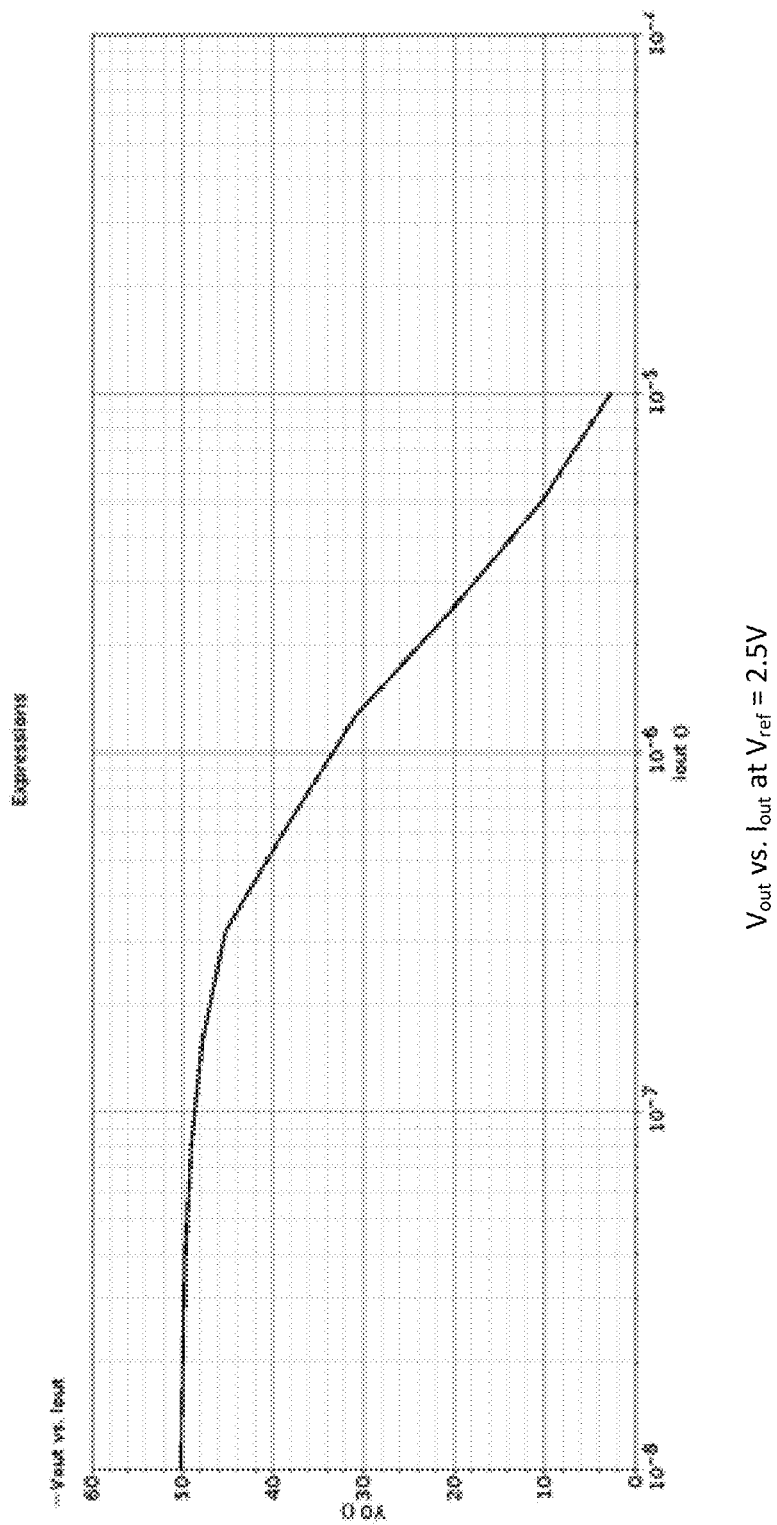
FIG. 26 shows the output voltage ($V_{out}$) as a function of $I_{out}$ for a simulated charge pump that includes switching stages comprising both NMOS and PMOS transistors.
Figure 27:
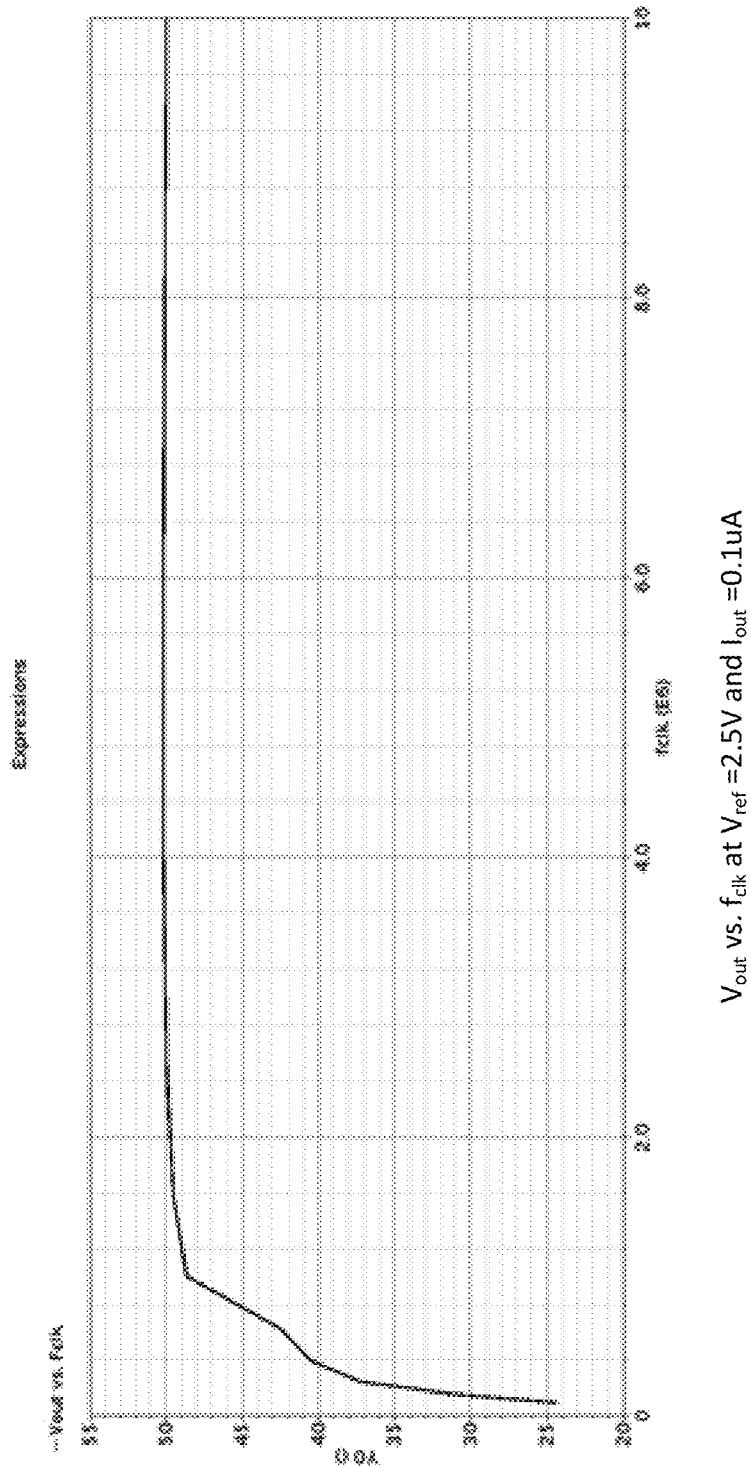
FIG. 27 is a plot of the output voltage ($V_{out}$) versus the clock frequency ($f_{clk}$) for a simulated charge pump.
Figure 28:
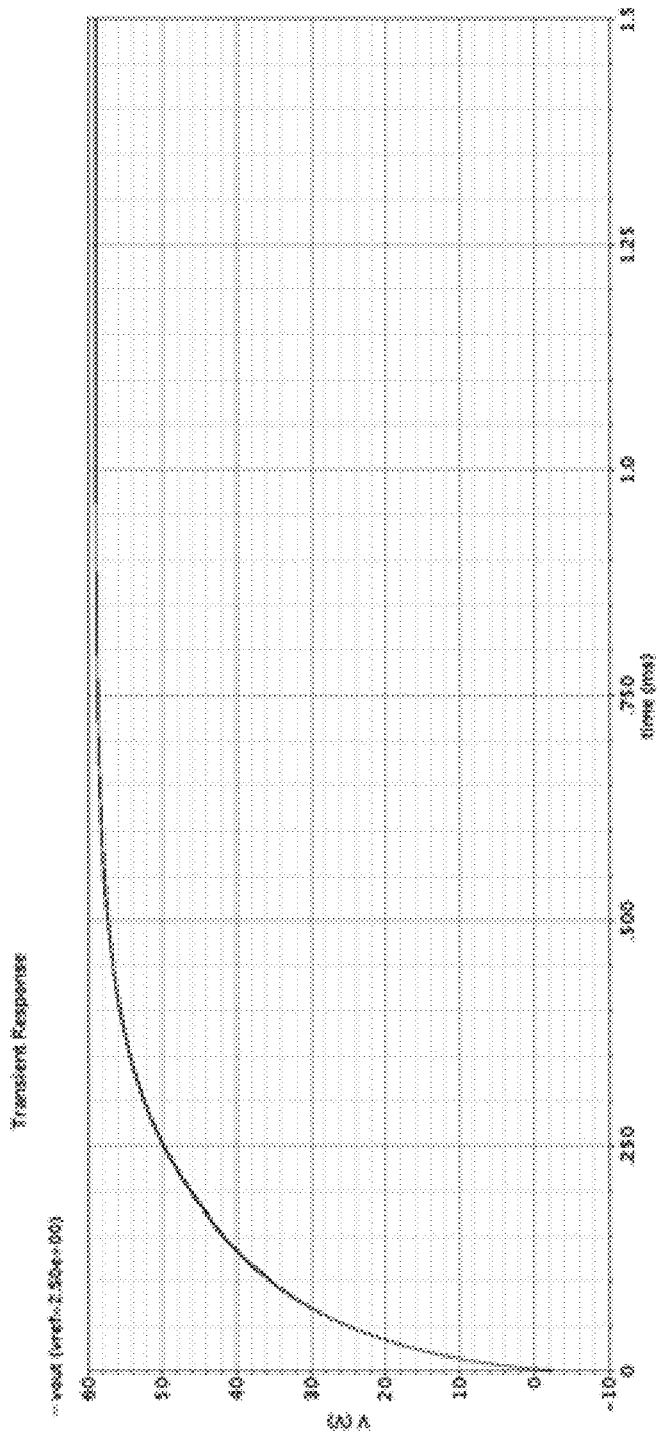
FIG. 28 shows the output voltage ($V_{out}$) versus the total number of switching stages in a simulated charge pump circuit.

For the simulation results shown in FIGS. 26-28, simulations were performed for a 10-stage charge pump with $V_{ref} = 2.5V$ and an output current ($I_{out}$) of 100 nA. FIG. 26 shows the output voltage ($V_{out}$) as a function of $I_{out}$. FIG. 27 is a plot of the output voltage ($V_{out}$) versus the clock frequency ($f_{clk}$). FIG. 28 shows the output voltage ($V_{out}$) versus the total number of switching stages in the charge pump circuit.

As those skilled in the art will appreciate, the proposed charge pump configurations disclosed may be used in various applications such as, for example, the tuning of MEMS components, the generation of the polarization voltage for MEMS gyroscopes, the tuning of MEMS RF Filters, the tuning of variable capacitors in VCO, in addition to use in LCD or white LED drivers. The disclosed charge pump configurations can also be utilized to operate audio amplifiers and speakers on low voltage supplies (e.g., in cell phones) as well as to bias Piezoelectric devices. To further illustrate the advantages of the disclosed charge pump configurations, reference is made to FIG. 29, which provides a comparison between the all-PMOS charge pump configuration and NMOS/PMOS charge pump configuration described herein versus conventional charge pump configurations.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A charge pump circuit, comprising:
a plurality of switching stages comprising a first switching stage and a last switching stage, each of the plurality of switching stages including a clock input, a clock input inverse, a clock output, and a clock output inverse;
a plurality of pumping capacitors, wherein one or more of the plurality of pumping capacitors are coupled to a corresponding switching stage of the plurality of switching stages; and
a maximum selection circuit coupled to the last switching stage among the plurality of switching stages, the maximum selection circuit configured to filter noise on the output clock and the output clock inverse of the last switching stage, the maximum selection circuit further configured to generate a direct current (DC) output voltage based on selection of a maximum of the output clock and the output clock inverse of the last switching stage.

2. The charge pump circuit of claim 1, wherein both the clock input and the clock input inverse of the first switching stage among the plurality of switching stages are configured to receive an input ranging from 0V to an input voltage (Vin).

3. The charge pump circuit of claim 2, further comprising a clock level shifting circuit configured to generate a differential clock signal for the clock input and the clock input inverse of the first switching stage among the plurality of switching stages, wherein the differential clock signal ranges from approximately 0V to 2Vin.

4. The charge pump circuit of claim 3, wherein the clock level shifting circuit comprises a plurality of clock level shifting stages, wherein each clock level shifting stage of the plurality of clock level shifting stages is coupled to a corresponding switching stage of the plurality of switching stages.

5. The charge pump circuit of claim 3, wherein each of the plurality of clock level shifting stages comprises P-type metal-oxide-semiconductor (PMOS) transistors.

6. The charge pump circuit of claim 3, wherein each of the plurality of switching stages is selected from the group consisting of P-type metal-oxide-semiconductor (PMOS) transistors, and an n-type metal-oxide-semiconductor (NMOS) transistor.

7. The charge pump circuit of claim 1, wherein each of the plurality of switching stages comprise a first pumping capacitor of the plurality of pumping capacitors connected across the clock input and the clock output of that switching stage, and a second pumping capacitor of the plurality of pumping capacitors connected across the clock input inverse and the clock output inverse of that switching stage.

8. The charge pump circuit of claim 1, wherein the plurality of pumping capacitors comprise low voltage capacitors with a voltage rating of approximately Vin.

9. The charge pump circuit of claim 1, wherein each of the plurality of switching stages has a voltage gain and the voltage gain of each of the plurality of switching stages is equal to Vin.

10. The charge pump circuit of claim 1, wherein an output voltage ($V_{out}$) at the last switching stage is expressed as:

$$V_{out} = (N+1)V_{in} - NV_t,$$

wherein N represents the total number of the plurality of switching stages, $V_{in}$ represents an input peak voltage of the clock input at the first switching stage of the plurality of switching stages, and $V_t$ represents a threshold voltage.

11. The charge pump circuit of claim 1, including, a low-dropout (LDO) regulator configured to adjust an input voltage of the charge pump circuit.

12. The charge pump circuit of claim 11, wherein an LDO output voltage ($V_{LDO}$) of the LDO regulator is expressed as:

$$V_{LDO} = \left(1 + \frac{R_2}{R_1}\right)V_{ref},$$

wherein $R_1$ and $R_2$ are voltage divider resistors in the LDO regulator, $V_{ref}$ is a reference voltage, and the LDO output voltage ($V_{LDO}$) of the LDO regulator is the input voltage of the charge pump circuit.

13. The charge pump circuit of claim 11, further comprising a clock level shifting circuit configured to generate a differential clock signal for the clock input and the clock input inverse of the first switching stage among the plurality of switching stages, wherein the differential clock signal ranges from approximately 0V to 2Vin.

14. The charge pump circuit of claim 13, wherein the clock level shifting circuit comprises a plurality of clock level shifting stages, wherein each clock level shifting stage of the plurality of clock level shifting stages is coupled to a corresponding switching stage of the plurality of switching stages.

15. The charge pump circuit of claim 13, wherein each of the plurality of clock level shifting stages comprises P-type metal-oxide-semiconductor (PMOS) transistors.

16. The charge pump circuit of claim 13, wherein each of the plurality of switching stages is selected from the group consisting of P-type metal-oxide-semiconductor (PMOS) transistors, and an n-type metal-oxide-semiconductor (NMOS) transistor.

17. The charge pump circuit of claim 1, wherein for each switching stage of the plurality of switching stages, a first pumping capacitor of the plurality of pumping capacitors is coupled across the clock input and the clock output, wherein the clock output for each switching stage is greater than the corresponding input clock by approximately $V_{in}$, wherein $V_{in}$ is a voltage level of the first clock input.

18. The charge pump circuit of claim 1, wherein each of the plurality of pumping capacitors is shielded by an nwell shield layer.

19. The charge pump circuit of claim 18, wherein each nwell shield layer for each pumping capacitor is connected to a clock signal with a same polarity of the corresponding pumping capacitor.

* * * * *